(12) United States Patent
Nakamura et al.

(10) Patent No.: US 7,760,177 B2
(45) Date of Patent: Jul. 20, 2010

(54) DISPLAY DEVICE AND COLOR FILTER SUBSTRATE

(75) Inventors: Kozo Nakamura, Kashiba (JP); Kazunari Tomizawa, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 853 days.

(21) Appl. No.: 11/533,392

(22) Filed: Sep. 20, 2006

(65) Prior Publication Data
US 2007/0063946 A1 Mar. 22, 2007

(30) Foreign Application Priority Data
Sep. 21, 2005 (JP) .............................. 2005-274510

(51) Int. Cl.
*G09G 3/34* (2006.01)
(52) U.S. Cl. ............................ 345/88; 345/55; 345/204
(58) Field of Classification Search ................... 345/88, 345/55, 204
See application file for complete search history.

(56) References Cited

U.S. PATENT DOCUMENTS

| | | | |
|---|---|---|---|
| 4,800,375 A | 1/1989 | Silverstein et al. | |
| 5,899,550 A * | 5/1999 | Masaki | 349/109 |
| 7,079,214 B2 | 7/2006 | Shimoshikiryo | |
| 7,495,722 B2 * | 2/2009 | Roth et al. | 349/106 |
| 2004/0174389 A1 | 9/2004 | Ben-David et al. | |
| 2005/0122294 A1 | 6/2005 | Ben-David et al. | |
| 2006/0097972 A1 | 5/2006 | Takeuchi et al. | |
| 2008/0192178 A1 * | 8/2008 | Ben-David et al. | 349/68 |

FOREIGN PATENT DOCUMENTS

| | | |
|---|---|---|
| EP | 0 347 187 A2 | 12/1989 |
| JP | 2527477 B2 | 8/1996 |
| JP | 09-251160 A | 9/1997 |
| JP | 10-123501 A | 5/1998 |
| JP | 2001-209047 A | 8/2001 |
| JP | 2001-306023 A | 11/2001 |
| JP | 2004-062146 A | 2/2004 |
| JP | 2004-078157 A | 3/2004 |
| JP | 2004-529396 A | 9/2004 |
| JP | 2005-523465 A | 8/2005 |

OTHER PUBLICATIONS

Young-Chol Yang et al., SID 05 Digest, "Development of Six Primary-Color LCD", pp. 1210-1213, May 25, 2005.
Chino et al., SID 06 Digest, "Invited Paper: Development of Wide-Color-Gamut Mobile Displays with Four-primary-color LCDs", pp. 1221-1224, Jun. 7, 2006.
Moshe Ben-Chorin, FPD International 2005 Forum, "Improving LCD TV color using Multi-Primary Technology", Oct. 19, 2005.
Pointer, "The Gamut of Real Surface Colours," Color Research and Application, 1980, pp. 145-155, vol. 5, No. 3, Middlesex, England.

(Continued)

*Primary Examiner*—Richard Hjerpe
*Assistant Examiner*—Leonid Shapiro
(74) *Attorney, Agent, or Firm*—Keating & Bennett, LLP

(57) ABSTRACT

A display device includes a pixel defined by a plurality of subpixels. The plurality of subpixels include: first and second red subpixels for displaying red; a green subpixel for displaying green; a blue subpixel for displaying blue; and a yellow subpixel for displaying yellow.

58 Claims, 31 Drawing Sheets

OTHER PUBLICATIONS

English translation of the official communication issued in counterpart International Application No. PCT/JP2006/318486, mailed on Sep. 18, 2008.

Official communication issued in the corresponding International Application No. PCT/JP2006/318486, mailed on Nov. 28, 2006.

* cited by examiner

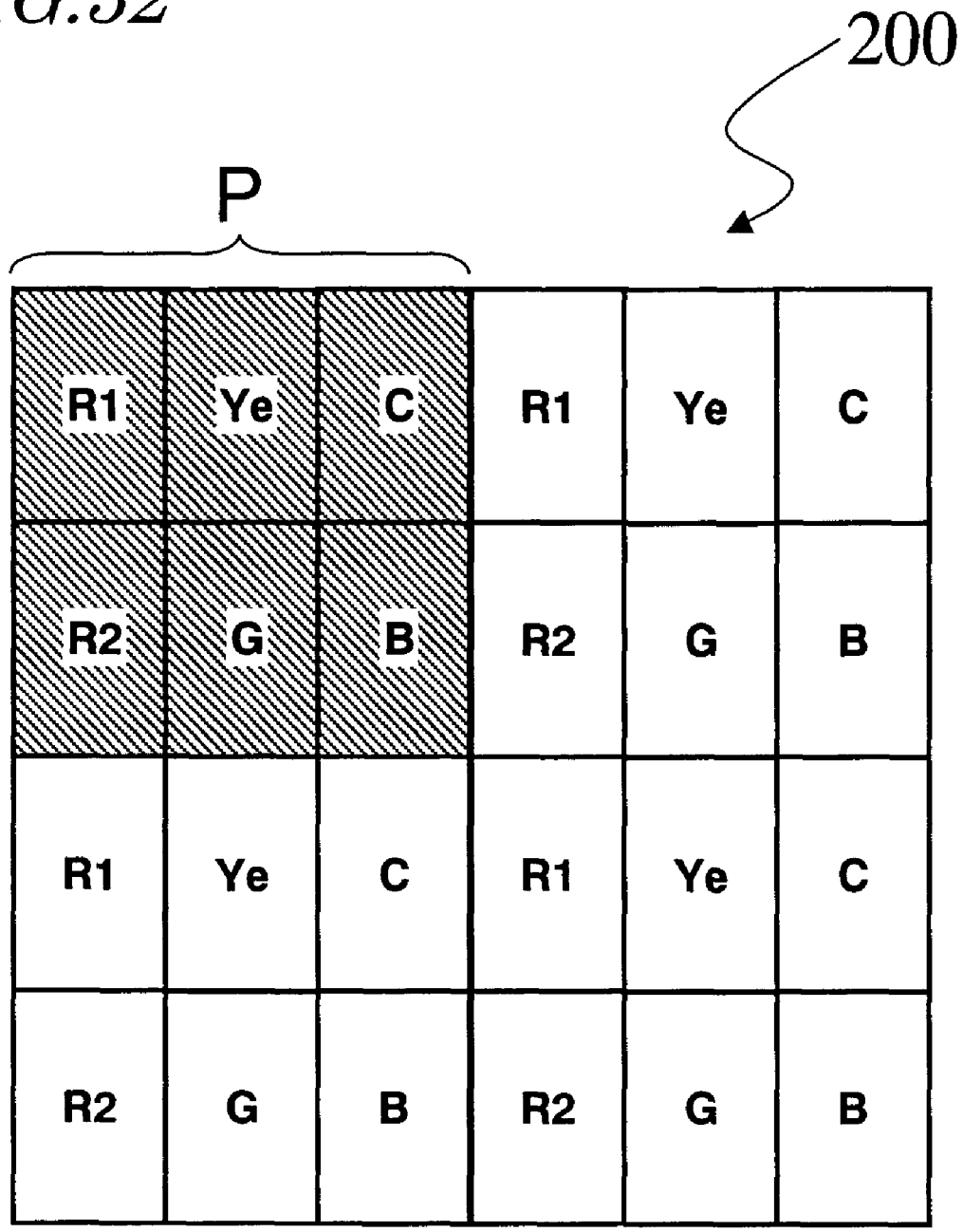

DISPLAY DEVICE AND COLOR FILTER SUBSTRATE

BACKGROUND OF THE INVENTION

1. Field of the Invention

The present invention relates to a display device, and more particularly to a multiprimary display device which performs display by using four or more primary colors. The present invention also relates to a color filter substrate for use in such a display device.

2. Description of the Related Art

Currently, various display devices are used in a variety of applications. In commonly-used display devices, each pixel is composed of three subpixels for displaying three primaries of light (i.e., red, green and blue), whereby multicolor display is achieved.

A problem of conventional display devices is that they can only display colors in a limited range (referred to as a "color reproduction range" or a "color gamut"). FIG. 47 shows a color gamut of a conventional display device which performs display by using three primaries. FIG. 47 is an xy chromaticity diagram in an XYZ color system, where a color gamut is shown by a triangle whose apices are at three points corresponding to the three primaries of red, green and blue. Also shown in FIG. 47 are plotted colors (represented by "X" symbols) of various objects in nature, as taught by Pointer (see M. R. Pointer, "The gamut of real surface colors," Color Research and Application, Vol. 5, No. 3, pp. 145-155 (1980)). As can be seen from FIG. 47, there are some object colors which do not fall within the color gamut. Thus, display devices which perform display by using three primaries are unable to display certain object colors.

Therefore, in order to expand the color gamut of a display device, there has been proposed a technique which increases the number of primary colors to be used for displaying to four or more.

For example, as shown in FIG. 48, Japanese National Publication No. 2004-529396 (hereinafter, "Patent Document 1") discloses a liquid crystal display device 800 each of whose pixels P is composed of six subpixels R, G, B, Ye, C and M for displaying red, green, blue, yellow, cyan, and magenta, respectively. The color gamut of the liquid crystal display device 800 is shown in FIG. 49. As seen from FIG. 49, a color gamut which is represented as a hexagonal shape whose apices are at six points corresponding to the six primary colors substantially encompasses all object colors. Thus, the color gamut can be expanded by increasing the number of primary colors to be used for displaying. In the present specification, any display device which performs display by using four or more primary colors will be generally referred to as a "multiprimary display device".

However, the inventors have performed a detailed study concerning the display quality of multiprimary display devices, and thus found that sufficient display quality cannot be achieved by merely increasing the number of primary colors. For example, in accordance with the display device disclosed in Patent Document 1, the actually-displayed red colors will appear blackish (i.e., dark red), which means that there actually exist some object colors that cannot be displayed.

SUMMARY OF THE INVENTION

In order to overcome the problems described above, preferred embodiments of the present invention provide: a display device which has an expanded color gamut and is able to display bright red; and a color filter substrate for use in such a display device.

A display device according to a preferred embodiment of the present invention is a display device comprising a pixel defined by a plurality of subpixels, wherein the plurality of subpixels include: first and second red subpixels for displaying red; a green subpixel for displaying green; a blue subpixel for displaying blue; and a yellow subpixel for displaying yellow.

In a preferred embodiment, the first and second red subpixels each have a Y value of no less than 5% and no more than 11%; the green subpixel has a Y value of no less than 20% and no more than 35%; the blue subpixel has a Y value of no less than 5% and no more than 10%; and the yellow subpixel has a Y value of no less than 30% and no more than 50%, where a Y value in the XYZ color system of the pixel when displaying white is defined as 100%.

In a preferred embodiment, the first and second red subpixels each have a dominant wavelength of no less than 605 nm and no more than 635 nm; the green subpixel has a dominant wavelength of no less than 520 nm and no more than 550 nm; the blue subpixel has a dominant wavelength of no more than 470 nm; and the yellow subpixel has a dominant wavelength of no less than 565 nm and no more than 580 nm.

In a preferred embodiment, the first and second red subpixels each have a color purity of no less than 90%; the green subpixel has a color purity of no less than 65% and no more than 80%; the blue subpixel has a color purity of no less than 90% and no more than 95%; and the yellow subpixel has a color purity of no less than 85% and no more than 95%.

In a preferred embodiment, the plurality of subpixels are of substantially the same size.

In a preferred embodiment, the first and second red subpixels are driven independently of each other.

In a preferred embodiment, the first and second red subpixels are driven by a same switching element.

In a preferred embodiment, within the pixel, the first red subpixel and the second red subpixel are disposed contiguous to each other.

In a preferred embodiment, within the pixel, the green subpixel and the yellow subpixel are disposed contiguous to each other and interposed between other subpixels.

In a preferred embodiment, within the pixel, the first red subpixel, the second red subpixel, the green subpixel, and the yellow subpixel are disposed contiguous to one another.

In a preferred embodiment, plurality of subpixels further include a cyan subpixel for displaying cyan.

In a preferred embodiment, the cyan subpixel has a Y value of no less than 10% and no more than 30%, where a Y value in the XYZ color system of the pixel when displaying white is defined as 100%.

In a preferred embodiment, the cyan subpixel has a dominant wavelength of no less than 475 nm and no more than 500 nm.

In a preferred embodiment, the cyan subpixel has a color purity of no less than 65% and no more than 80%.

In a preferred embodiment, within the pixel, the cyan subpixel, the green subpixel, and the blue subpixel are disposed contiguous to one another.

In a preferred embodiment, a display device according to the present invention is a liquid crystal display device comprising a liquid crystal layer.

A color filter substrate according to a preferred embodiment of the present invention is a color filter substrate for a display device having a pixel defined by a plurality of subpixels, comprising: a substrate; and a plurality of color filters provided in a region of the substrate corresponding to the pixel, wherein, the plurality of color filters include: first and second red color filters for allowing red light to be transmitted therethrough; a green color filter for allowing green light to be transmitted therethrough; a blue color filter for allowing blue light to be transmitted therethrough; and a yellow color filter for allowing yellow light to be transmitted therethrough.

In a preferred embodiment, the plurality of color filters further include a cyan color filter for allowing cyan light to be transmitted therethrough.

A pixel of a display device according to a preferred embodiment of the present invention includes not only subpixels for displaying red, green and blue, but also subpixels for displaying other colors. In other words, more than three primary colors are used for displaying by the display device according to a preferred embodiment of the present invention, thus resulting in a color gamut which is wider than that of a conventional display device which uses three primaries for displaying. Moreover, the pixel of the display device according to a preferred embodiment of the present invention includes two subpixels for displaying red, whereby the Y value of red can be improved and bright red can be displayed.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 32 is a diagram schematically showing another liquid crystal display device 200 according to a preferred embodiment of the present invention.

DETAILED DESCRIPTION OF PREFERRED EMBODIMENTS

Hereinafter, preferred embodiments of the present invention will be described with reference to the accompanying drawings.

Before describing embodiments of the present invention, the reason why red appears blackish (dark) in the liquid crystal display device 800 disclosed in Patent Document 1 will be described.

When the number of primary colors to be used for displaying is increased, the number of subpixels per pixel increases, which inevitably reduces the area of each subpixel. This results in a lowered lightness (which corresponds to the Y value in the XYZ color system) of the color to be displayed by each subpixel. For example, if the number of primary colors used for displaying is increased from three to six, the area of each subpixel is reduced to about half, so that the lightness (Y value) of each subpixel is also reduced to about half.

Figure 49:
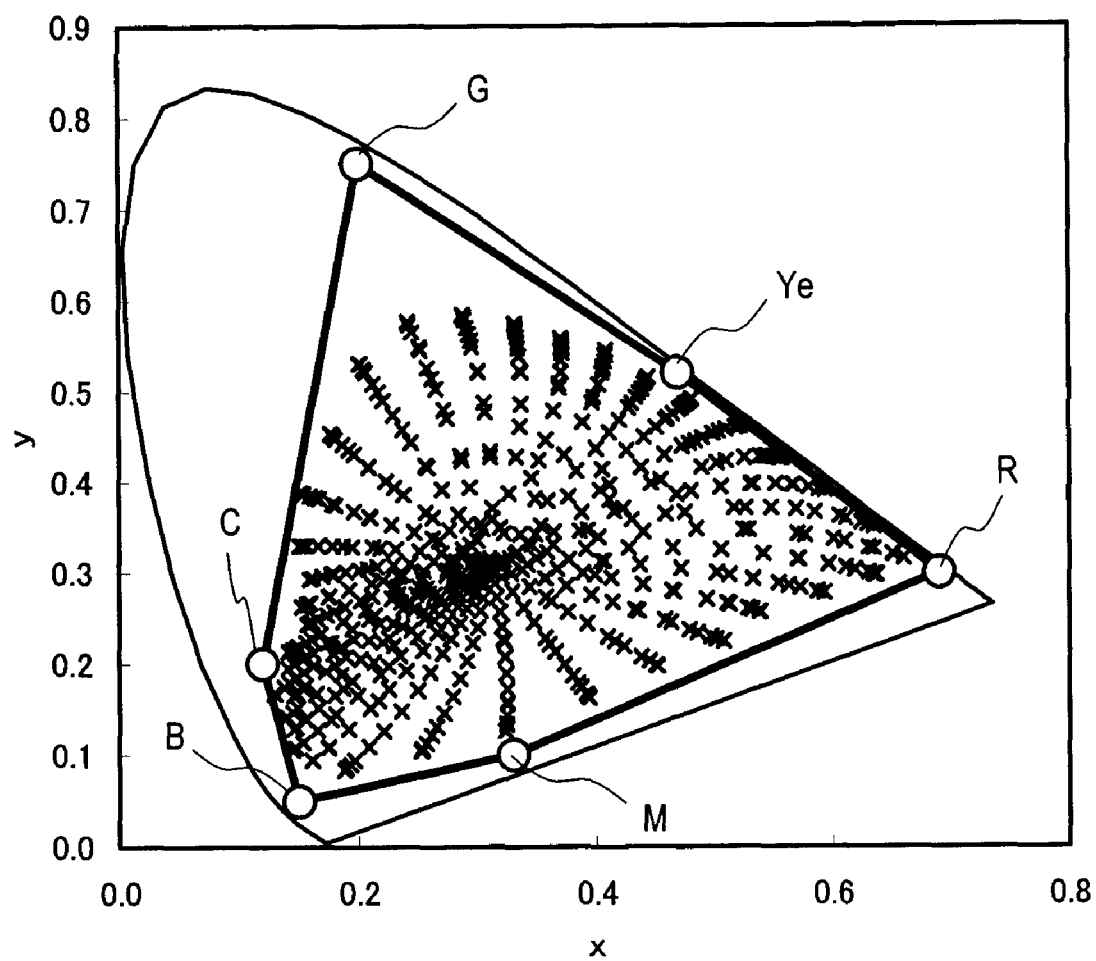
FIG. 49 is a diagram showing a color gamut of the liquid crystal display device 800.

"Lightness" is one of the three factors which define a color, the other two being "hue" and "chroma". Therefore, even if the color gamut on the xy chromaticity diagram (i.e., reproducible range of "hue" and "chroma") may be broadened by increasing the number of primary colors as shown in FIG. 49, the lowered "lightness" prevents the actual color gamut (i.e., the color reproduction range which also takes "lightness" into account) from becoming sufficiently wide.

According to a study by the inventors, while subpixels for displaying green and blue can still sufficiently display various object colors under lowered lightness, it is the subpixels for displaying red that become unable to display some object colors under lowered lightness. If the lightness (Y value) becomes lower because of using an increased number of primary colors, the display quality of red is degraded such that red appears blackish red (i.e., dark red).

The present invention has been made based on the above findings. Hereinafter, embodiments of the present invention will be described with reference to the figures. Although the following descriptions will be directed to liquid crystal display devices as an example, the present invention can be suitably used for various display devices such as CRTs (cathode-ray tubes), organic EL display devices, plasma display panels, and SEDs (Surface-conduction Electron-emitter Displays), as well as liquid crystal display devices.

Figure 1:
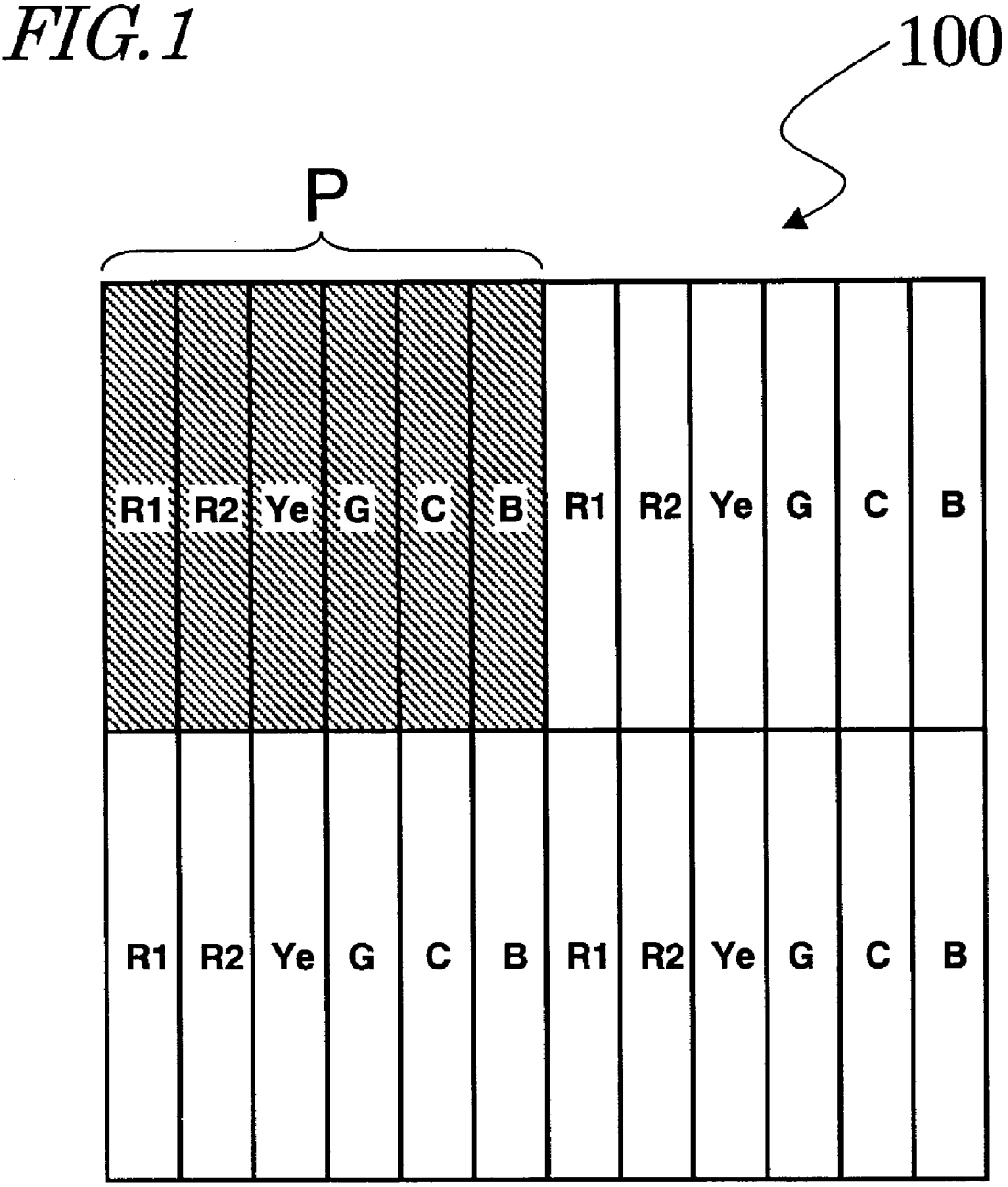
FIG. 1 is a diagram schematically showing a liquid crystal display device 100 according to a preferred embodiment of the present invention.

FIG. 1 schematically shows a liquid crystal display device 100 according to the present embodiment. The liquid crystal display device 100 includes a plurality of pixels in a matrix arrangement. FIG. 1 shows four pixels P among the plurality of pixels of the liquid crystal display device 100.

As shown in FIG. 1, each pixel P is defined by a plurality of subpixels, namely: first and second red subpixels R1 and R2 for displaying red; a green subpixel G for displaying green; a blue subpixel B for displaying blue; a yellow subpixel Ye for displaying yellow; and a cyan subpixel C for displaying cyan. FIG. 1 shows an example where these six subpixels are arranged in one row by six columns within the pixel P.

Figure 2:
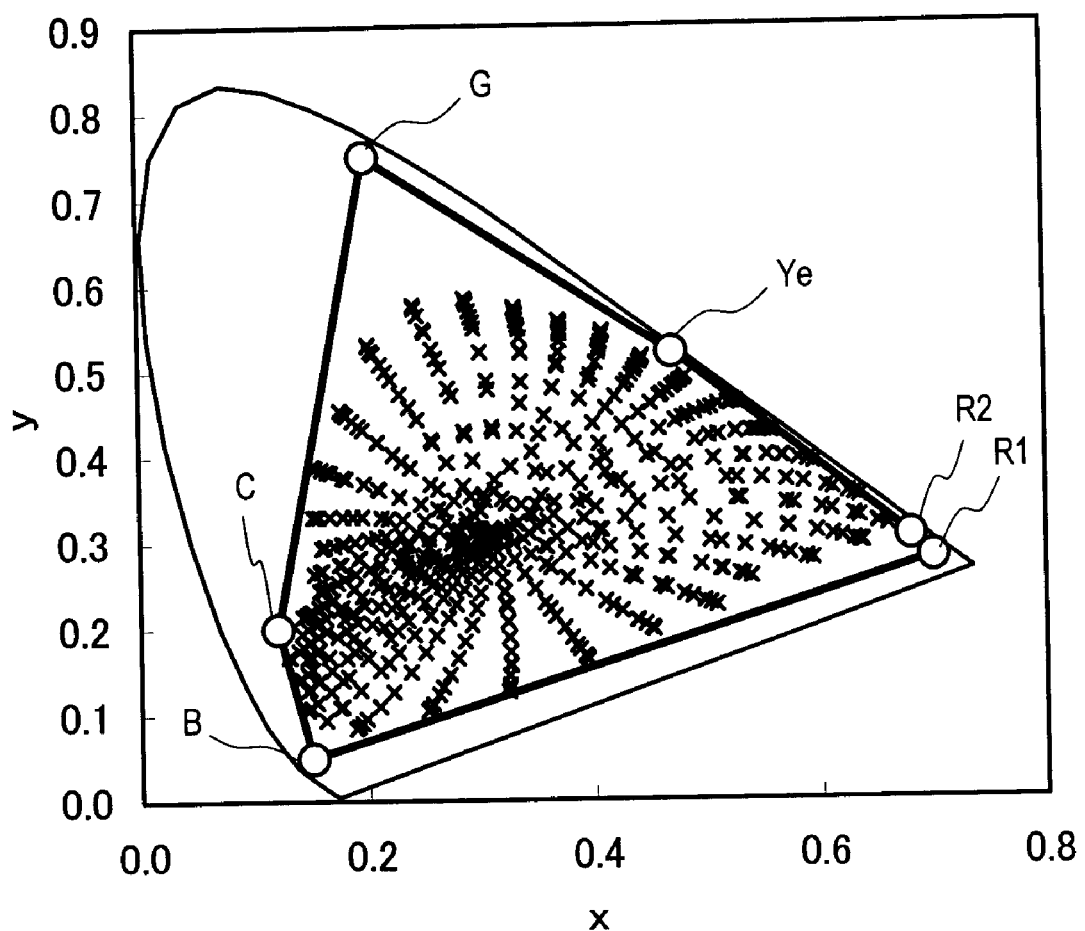
FIG. 2 is a diagram showing a color gamut of the liquid crystal display device 100.

The liquid crystal display device 100 according to the present preferred embodiment has a wide color gamut because it uses more primary colors for displaying than any commonly-used liquid crystal display device that uses three primaries to perform display. FIG. 2 shows an exemplary color gamut of the liquid crystal display device 100. As shown in FIG. 2, the color gamut of the liquid crystal display device 100 encompasses various object colors.

Note that the color gamut shown in FIG. 2 has a hexagonal shape. This is because the red which is displayed by the first red subpixel R1 is different from the red which is displayed by the second red subpixel R2. It will be appreciated that the red displayed by the first red subpixel R1 may be identical to the red displayed by the second red subpixel R2, in which case the color gamut will have a pentagonal shape. In either case, the color gamut can be improved over that of a commonly-used liquid crystal display device whose color gamut has a triangular shape.

Figure 46:
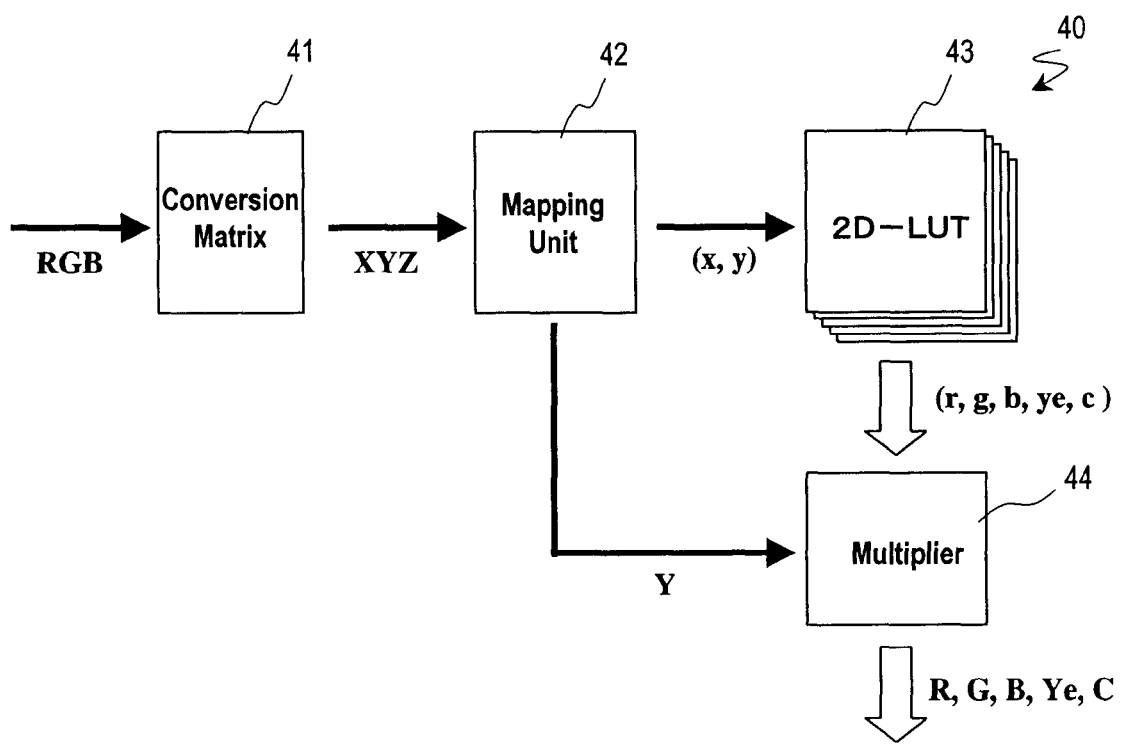
FIG. 46 is a block diagram schematically showing a multiprimary controller in the liquid crystal display devices 100 and 200.
Figure 47:
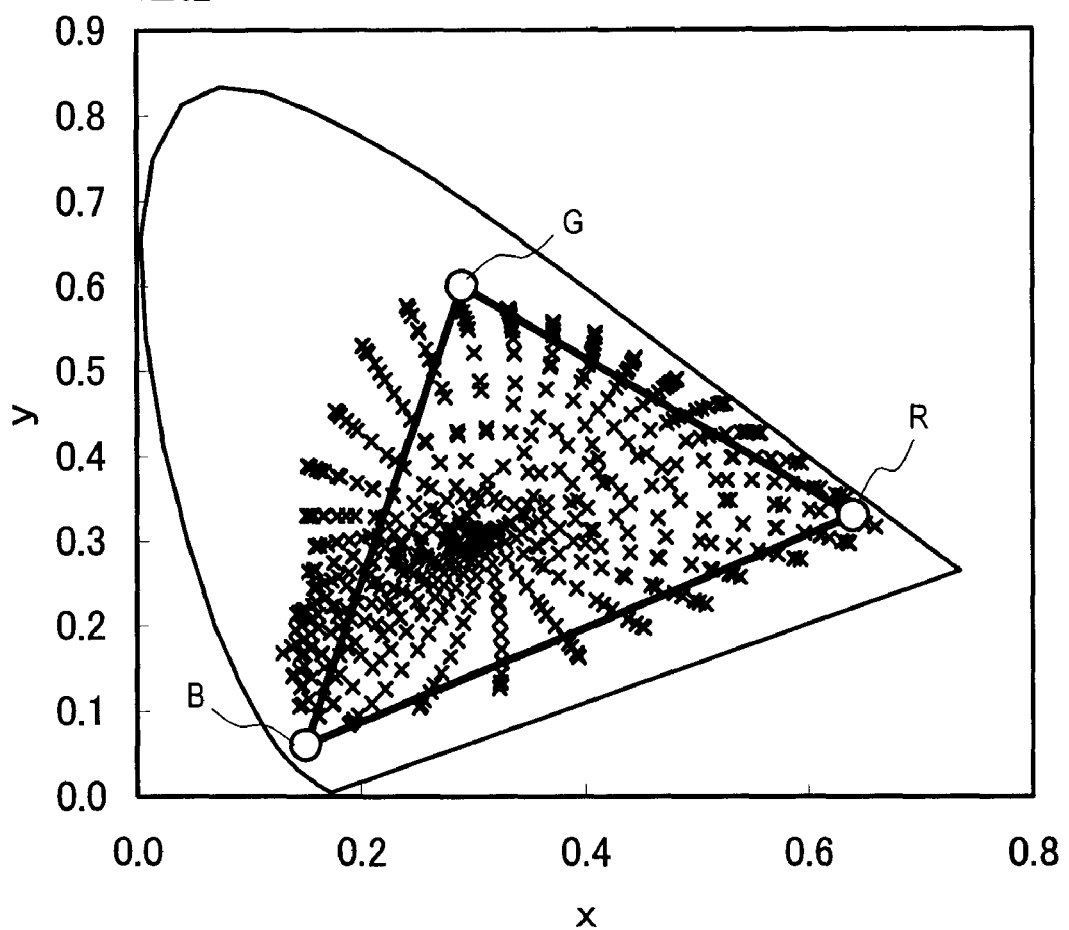
FIG. 47 is a diagram showing a color gamut of a conventional liquid crystal display device which uses three primaries for displaying.
Figure 48:
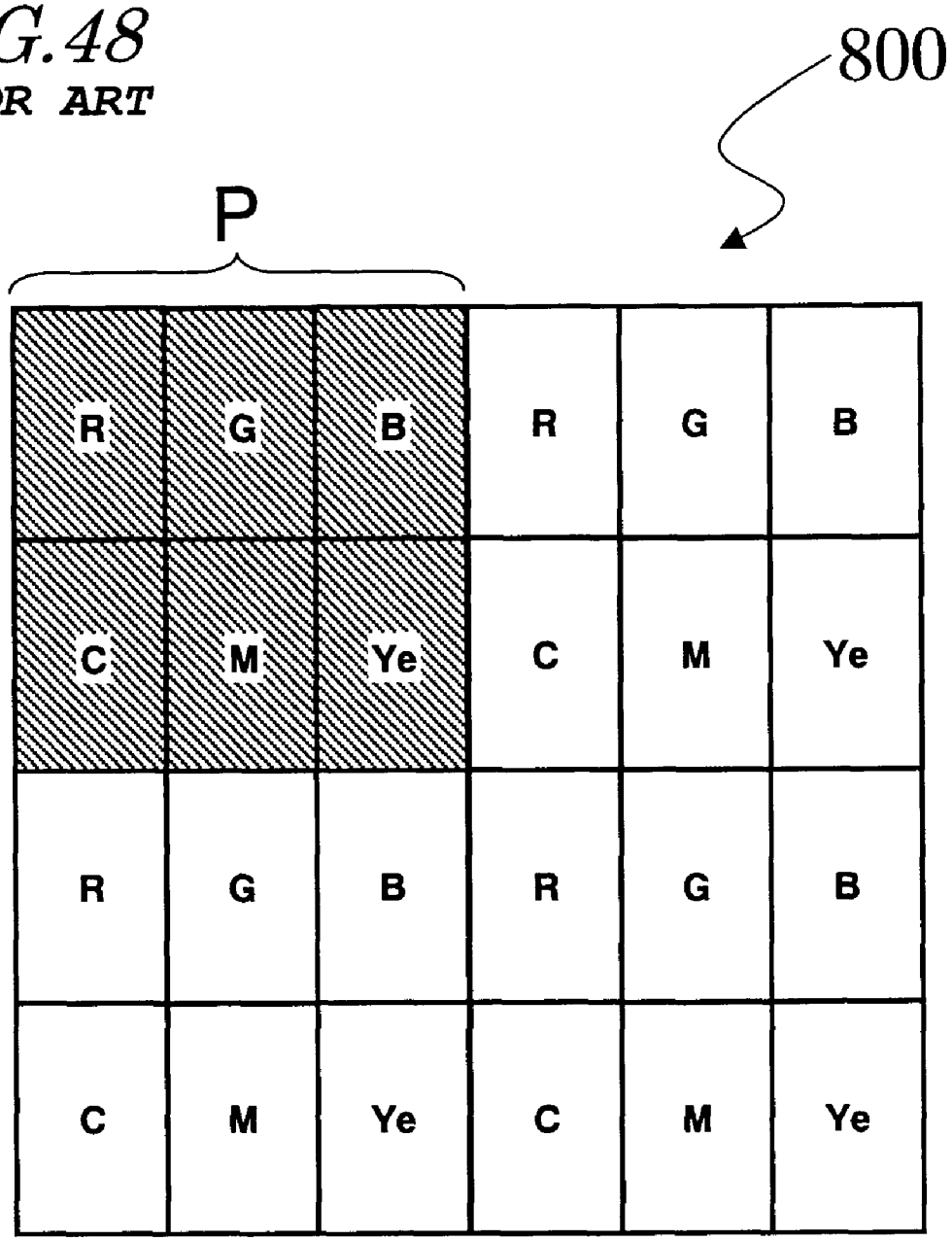
FIG. 48 is a diagram schematically showing a conventional multiprimary liquid crystal display device 800.

Moreover, since each pixel of the liquid crystal display device 100 according to the present preferred embodiment includes two subpixels for displaying red (i.e., first and second subpixels R1 and R2), the lightness (Y value) of red can be improved over that of the liquid crystal display device 800 shown in FIG. 46. Thus, bright red can be displayed. In other words, there is provided a wide color gamut which takes into account not only the hue and chroma on the xy chromaticity diagram but also lightness.

Now, improvement in the Y value of the liquid crystal display device 100 will be specifically described, in comparison with the multiprimary liquid crystal display device 800 of Patent Document 1.

Figure 3:
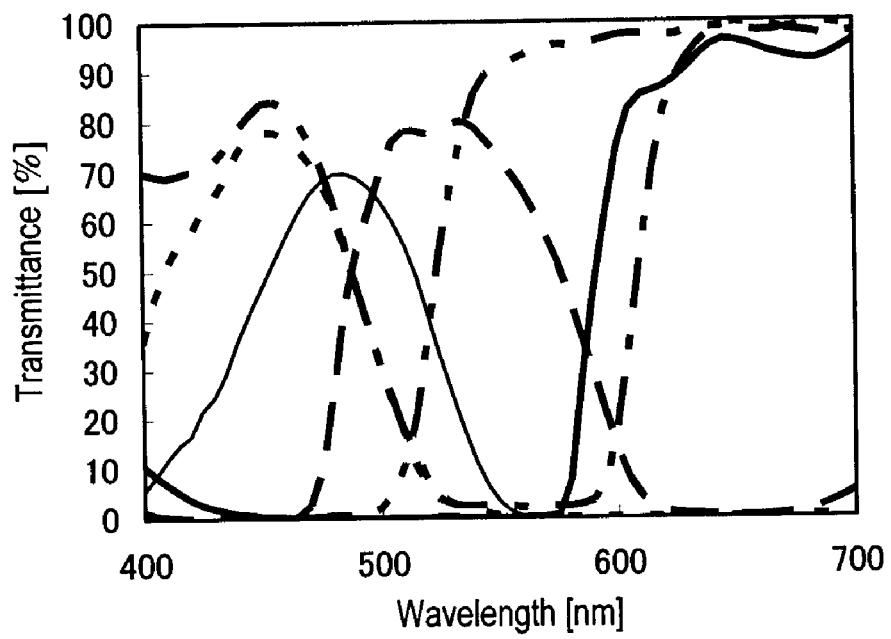
FIG. 3 is a graph showing spectral transmittance characteristics of color filters corresponding to a construction illustrated in Table 1.
Figure 4:
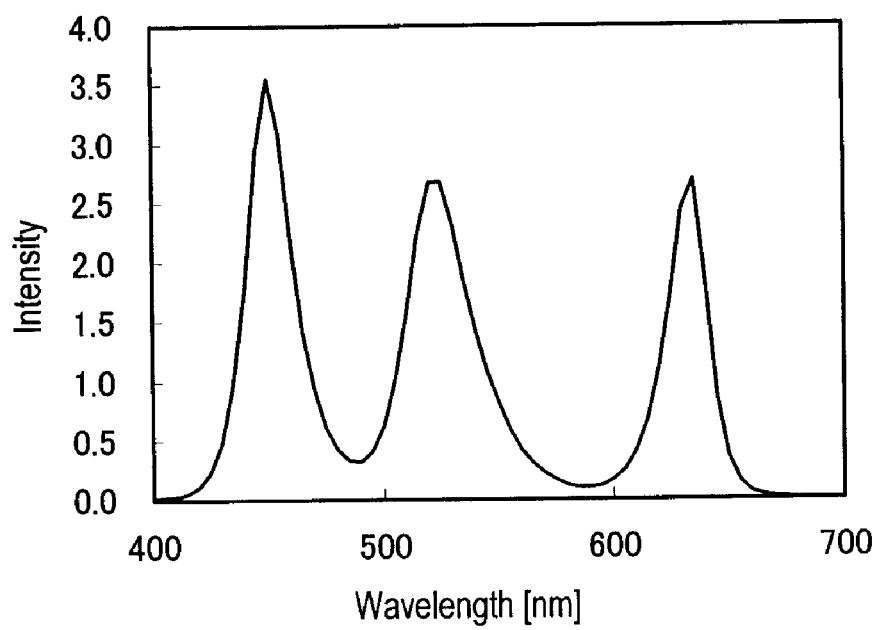
FIG. 4 is a graph showing a spectrum of backlight corresponding to the construction illustrated in Table 1.

Table 1 exemplifies a Y value, xy chromaticity, dominant wavelength (or complementary wavelength for magenta), and color purity of each subpixel, as well as its display quality, in the multiprimary liquid crystal display device 800 of Patent Document 1. Table 1 also shows a Y value, xy chromaticity, and color temperature of the case where the pixel is displaying white. The Y value of each subpixel represents a relative value taken against the Y value of the pixel when displaying white (defined as 100%). The dominant wavelength and complementary wavelength roughly represent hue. The color purity roughly represents chroma. Moreover, FIGS. 3 and 4 show spectral transmittance characteristics of color filters and a backlight spectrum, respectively, that correspond to this illustrated construction. In Table 1 as well as the following Tables, "⊚" represents "very good"; ○ represents "good"; and "X" represents "poor".

TABLE 1

|  | W | R | Ye | G | C | B | M |
|---|---|---|---|---|---|---|---|
| Y [%] | 100 | 8.1 | 33.6 | 31.6 | 11.9 | 3.9 | 11.2 |
| x | 0.285 | 0.684 | 0.446 | 0.177 | 0.132 | 0.147 | 0.293 |
| y | 0.293 | 0.299 | 0.534 | 0.727 | 0.224 | 0.061 | 0.122 |
| Dominant Wavelength [nm] | 9233* | 625 | 571 | 528 | 486 | 465 | 562* |
| Color Purity [%] |  | 96 | 94 | 82 | 75 | 93 | 74 |
| Display Quality |  | X | X | ◉ | ○ | X | ◉ |

*Color Temperature (K)

*Complementary Wavelength (nm)

As shown in Table 1, the subpixels R, B and Ye for displaying red, blue and yellow have a poor display quality. Moreover, the subpixel C for displaying cyan has a slightly inferior display quality to those of the subpixels G and M for displaying green and magenta. Note however that the results shown in Table 1 do not immediately apply to the primary colors that are used for displaying. The reason is that yellow, cyan and magenta can always be displayed through additive mixing of red, green and blue. Therefore, each of these colors (cyan, yellow, magenta) must be evaluated with respect to both of: the color which is displayed by the subpixel Ye, C or M alone; and a color which is displayed through additive color mixing.

Specifically, yellow must be evaluated with respect to both of: a yellow color which is displayed through mixing of the red which is displayed by the red subpixel R and the green which is displayed by the green subpixel G; and a yellow color which is displayed by the yellow subpixel Ye alone. Cyan must be evaluated with respect to both of: a cyan color which is displayed through mixing of the green which is displayed by the green subpixel G and the blue which is displayed by the blue subpixel B; and a cyan color which is displayed by the cyan subpixel C alone. Magenta must be evaluated with respect to both of: a magenta color which is displayed through mixing of the red which is displayed by the red subpixel R and the blue which is displayed by the blue subpixel B; and a magenta color which is displayed by the magenta subpixel M alone.

Table 2 exemplifies a Y value, xy chromaticity, dominant wavelength (or complementary wavelength for magenta), and color purity of each of the primary colors used for displaying by the liquid crystal display device 800, as well as its display quality.

It can be seen from Table 2 that a sufficient display quality is obtained also for yellow and cyan. This is a result of a greatly improved Y value, which in turn is obtained by taking into account (almost via a simple arithmetic sum) the color which is created through additive color mixing of other subpixels.

However, as shown in Table 2, the display quality for red is still low. This is because the Y value has become lower due to the increased number of primary colors. Incidentally, it appears that the display quality for blue is also low in the illustrated example. However, this is ascribable to an excessively low Y value which is associated with the specifications of the color filters and backlight that were used in this particular example. The low Y value for blue is not an essential problem because it can be overcome by changing the specifications of the color filters and backlight.

Figure 5:
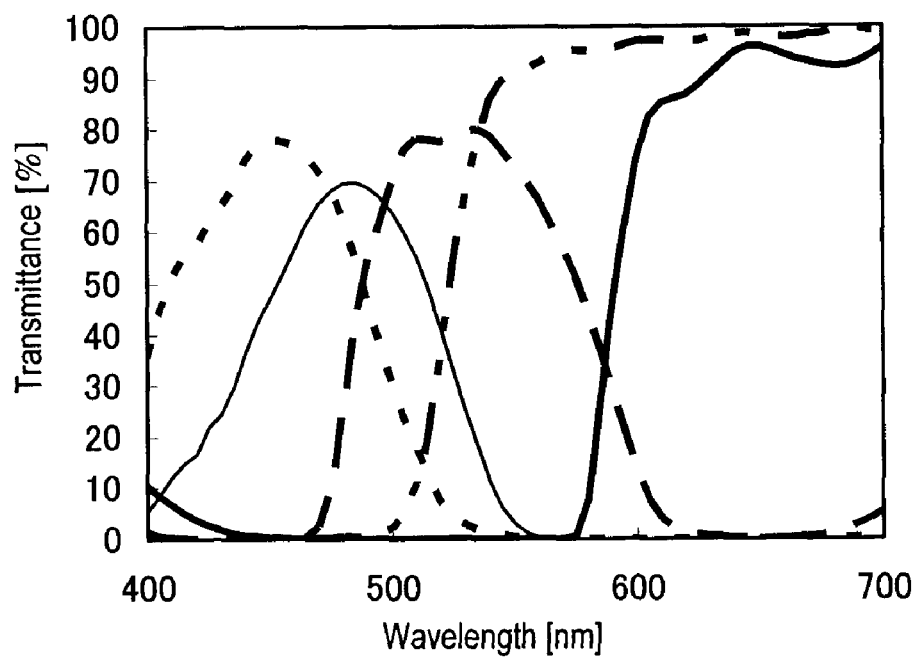
FIG. 5 is a graph showing spectral transmittance characteristics of color filters corresponding to a construction illustrated in Table 3.
Figure 6:
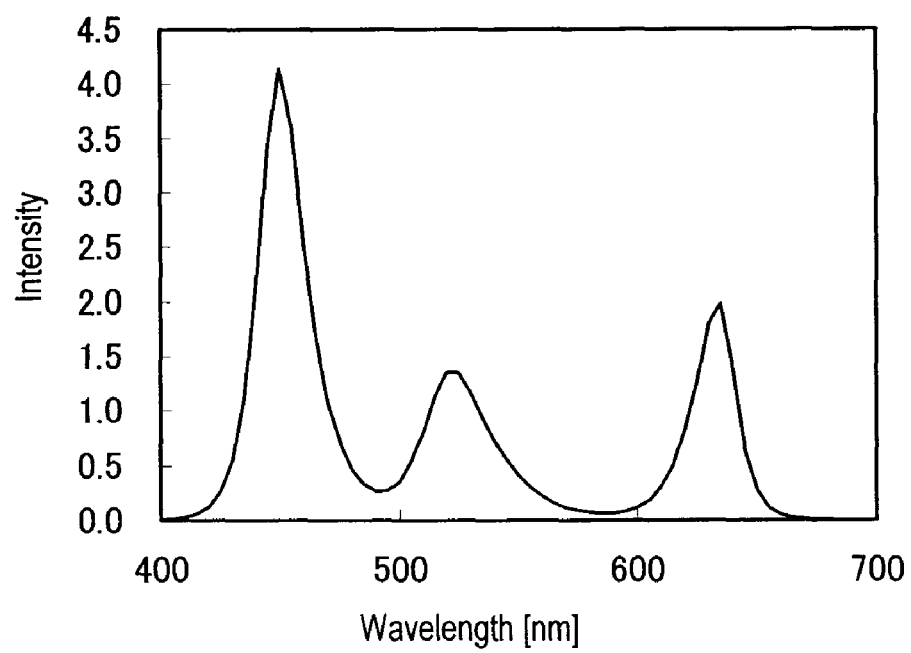
FIG. 6 is a graph showing a spectrum of backlight corresponding to the construction illustrated in Table 3.

Next, Table 3 exemplifies a Y value, xy chromaticity, dominant wavelength, and color purity of each subpixel, as well as its display quality, in the liquid crystal display device 100 according to the present preferred embodiment. Moreover, FIGS. 5 and 6 show spectral transmittance characteristics of color filters and a backlight spectrum, respectively, that correspond to this illustrated construction.

TABLE 2

|  | W | R | Ye* | G | C* | B | M* |
|---|---|---|---|---|---|---|---|
| Y [%] | 100 | 8.1 | 73.1 | 31.6 | 47.2 | 3.9 | 23.0 |
| x | 0.285 | 0.684 | 0.407 | 0.177 | 0.149 | 0.147 | 0.300 |
| y | 0.293 | 0.299 | 0.550 | 0.727 | 0.296 | 0.061 | 0.126 |
| Dominant Wavelength [nm] |  | 630 | 566 | 528 | 489 | 465 | 561† |
| Color Purity [%] |  | 94 | 87 | 82 | 65 | 93 | 74 |
| Display Quality |  | X | ◉ | ◉ | ◉ | X | ◉ |

*Ye = R + Ye + G

*C = G + C + B

*M = R + B + M

†Complementary Wavelength (nm)

TABLE 3

|   | W | R1 | R2 | Ye | G | C | B |
|---|---|---|---|---|---|---|---|
| Y [%] | 100 | 10.5 | 10.5 | 32.7 | 29.0 | 12.1 | 5.4 |
| x | 0.302 | 0.681 | 0.681 | 0.496 | 0.177 | 0.139 | 0.149 |
| y | 0.250 | 0.296 | 0.296 | 0.488 | 0.707 | 0.130 | 0.042 |
| Dominant Wavelength [nm] | 9594* | 630 | 630 | 579 | 527 | 476 | 460 |
| Color Purity [%] |  | 93 | 93 | 95 | 77 | 86 | 96 |
| Display Quality |  | X | X | X | ◎ | ○ | ◎ |

*Color Temperature (K)

As seen from Table 3, when looking at each subpixel alone, it appears that the first red subpixel R1, the second red subpixel R2, and the yellow subpixel Ye have a poor display quality. The display quality of the cyan subpixel C is also slightly inferior to those of the green subpixel G and the blue subpixel B. However, also in the liquid crystal display device 100 according to the present preferred embodiment, the results shown in Table 3 do not immediately apply to the primary colors that are used for displaying. In other words, each display quality rating shown in Table 3 merely represents a "display quality of a subpixel" rather than a "display quality of a primary color" that is used for displaying.

As has already been described, yellow and cyan must be evaluated with respect to both of: a color which is displayed by the yellow subpixel Ye or the cyan subpixel C alone; and a color which is displayed through additive color mixing. Red must be evaluated with respect to both of the red which is displayed by the first red subpixel R1 and the red which is displayed by the second red subpixel R2. In the liquid crystal display device 100 according to the present preferred embodiment, too, magenta can be displayed through color mixing (i.e., mixing of the red colors displayed by the first and second red subpixels R1 and R2 and the blue displayed by the blue subpixel B).

Table 4 exemplifies a Y value, xy chromaticity, dominant wavelength (or complementary wavelength for magenta), and color purity of each of the primary colors used for displaying by the liquid crystal display device 100 according to the present preferred embodiment, as well as its display quality.

Figure 7:
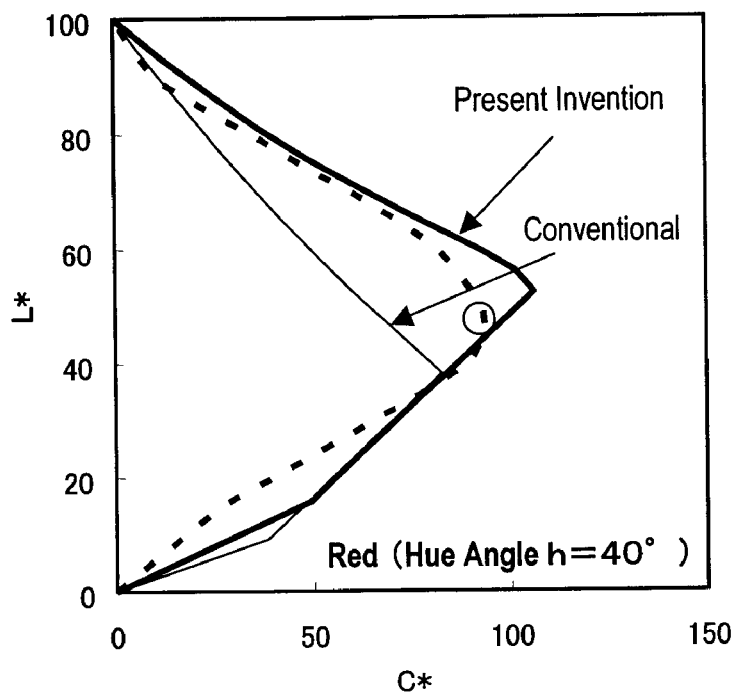
FIG. 7 is a graph showing C*-L* characteristics, with respect to red, of a liquid crystal display device 800 disclosed in Patent Document 1 and the liquid crystal display device 100 according to a preferred embodiment of the present invention.

FIG. 7 shows $C^*$-$L^*$ characteristics, with respect to red, of the liquid crystal display device 800 of Patent Document 1 and the liquid crystal display device 100 according to the present preferred embodiment. FIG. 7 is a graph showing a relationship between $C^*$ and $L^*$, with respect to a hue angle h=40° (corresponding to red) in the $L^*C^*h$ color system. $C^*$ corresponds to $\sqrt{[(a^*)^2+(b^*)^2]}$ in the $L^*a^*b^*$ color system, and represents chroma. $L^*$ corresponds to the Y value in the XYZ color system, and represents lightness. Also shown in FIG. 7 is a red range of object colors (dotted line).

As can be seen from FIG. 7, the liquid crystal display device 800 is unable to cover all of the red range of object colors because of the low lightness ($L^*$) of red. On the other hand, the liquid crystal display device 100 according to the present preferred embodiment covers all of the red range of object colors because of the high lightness of red. In particular, the liquid crystal display device 100 according to the present preferred embodiment is able to reproduce a red color of the highest chroma (shown encircled in FIG. 7), i.e., the vividest red color. Therefore, the color gamut is wide, and bright red can be displayed.

Note that the liquid crystal display device 100 according to the present preferred embodiment lacks any subpixels for displaying magenta, whereas the liquid crystal display device 800 of Patent Document 1 includes subpixels for displaying magenta. The inventors have also studied the impact of this omission on the displaying of magenta.

Figure 8:
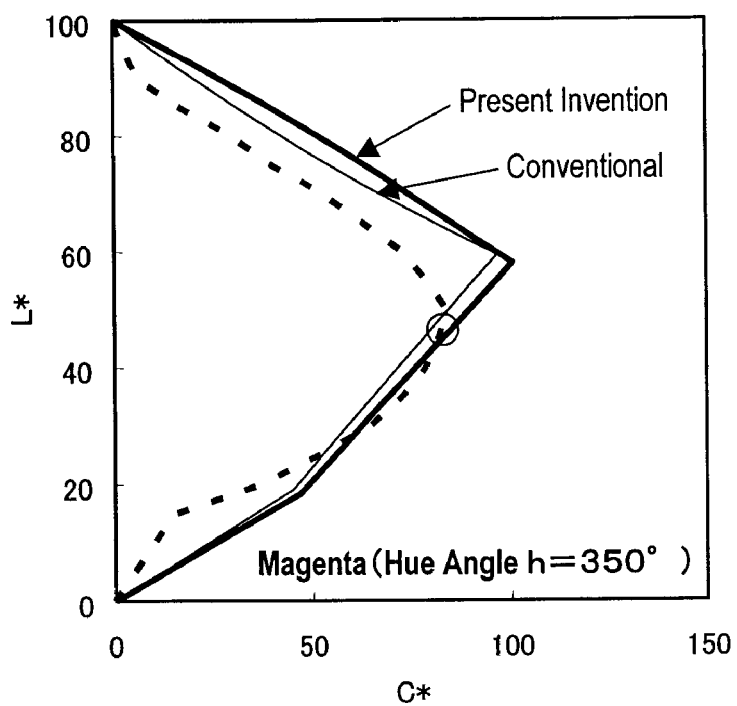
FIG. 8 is a graph showing C*-L* characteristics, with respect to magenta, of a liquid crystal display device 800 disclosed in Patent Document 1 and the liquid crystal display device 100 according to a preferred embodiment of the present invention.

FIG. 8 shows $C^*$-$L^*$ characteristics, with respect to magenta, of the liquid crystal display device 800 of Patent

TABLE 4

|   | W | R* | Ye* | G | C* | B | M* |
|---|---|---|---|---|---|---|---|
| Y [%] | 100 | 20.9 | 72.0 | 29.0 | 46.4 | 5.4 | 26.2 |
| x | 0.302 | 0.681 | 0.451 | 0.177 | 0.150 | 0.149 | 0.338 |
| y | 0.250 | 0.296 | 0.504 | 0.707 | 0.177 | 0.042 | 0.132 |
| Dominant Wavelength[nm] |  | 630 | 573 | 527 | 479 | 460 | 553† |
| Color Purity [%] |  | 94 | 86 | 77 | 76 | 96 | 80 |
| Display Quality |  | ◎ | ◎ | ◎ | ◎ | ◎ | ◎ |

*R = R1 + R2
*Ye = R1 + R2 + Ye + G
*C = G + C + B
*M = R1 + R2 + B
†Complementary Wavelength (nm)

As can be seen from Table 4, a very good display quality is obtained for yellow and cyan, and also for magenta. Furthermore, red also has a greatly improved Y value, thus resulting in a substantially improved display quality.

Now, the difference in red reproduction range between the liquid crystal display device 100 according to the present preferred embodiment and the liquid crystal display device 800 of Patent Document 1 will be described more specifically.

Document 1 and the liquid crystal display device 100 according to the present preferred embodiment. FIG. 8 is a graph showing a relationship between $C^*$ and $L^*$, with respect to a hue angle h=350° (corresponding to magenta) in the $L^*C^*h$ color system. Also shown in FIG. 8 is a magenta range of object colors (dotted line).

As can be seen from FIG. 8, in the liquid crystal display device 800 which includes a magenta subpixel in each pixel, the magenta range of object colors is substantially covered; that is, magenta of the highest chroma (shown encircled in FIG. 8) can be reproduced. The liquid crystal display device 100 according to the present preferred embodiment also substantially covers the magenta range of object colors, in spite of the omission of magenta subpixels, and is able to reproduce magenta of the highest chroma (i.e., vividest magenta). As can be seen from FIG. 8, the liquid crystal display device 100 according to the present preferred embodiment even covers a slightly broader range.

The reason why magenta object colors can be sufficiently reproduced even if magenta subpixels are omitted is that, as shown in FIG. 2, the magenta range of object colors has an almost linear extent, so that magenta object colors can be sufficiently reproduced through additive color mixing so long as the red subpixels R1 and R2 and the blue subpixel B have a sufficiently high color purity. On the other hand, the yellow and cyan ranges of object colors have a rounded extent as shown in FIG. 2, and therefore yellow and cyan object colors are difficult to be reproduced unless yellow subpixels Ye and cyan subpixels C are provided.

As described above, a liquid crystal display device according to the present preferred embodiment has a wide color gamut, and is able to display bright red. Note that the red which is displayed by the first red subpixel R1 and the red which is displayed by the second red subpixel R1 may be identical or different. In the case where they are identical, the manufacturing process of color filters can be shortened. In the case where they are different, there are six primary colors to be displayed by the subpixels (i.e., the color gamut has a hexagonal shape on the chromaticity diagram), and therefore the number of reproducible colors (in particular the number of displayed colors in the vicinity of red) increases.

Next, preferable ranges for the Y value, dominant wavelength, and color purity of each subpixel of the liquid crystal display device 100 will be discussed.

In order to achieve highly true color reproduction, it is preferable to determine the lightness (i.e., Y value) of each primary color used for displaying in accordance with the lightness of object colors. FIGS. 9A to 9C and FIGS. 10A to 10C show C*-L* characteristics of object colors, with respect to red (h=40°), green (h=160°), blue (h=310°), yellow (h=90°), cyan (h=220°), and magenta (h=350°).

Figure 9A:
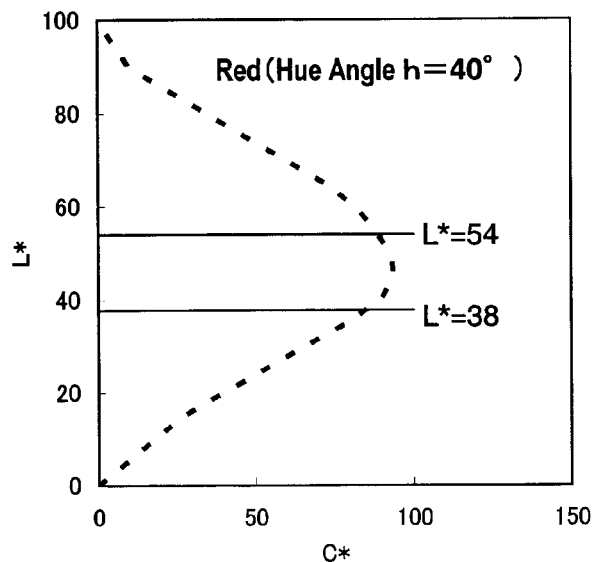
FIGS. 9A, 9B and 9C are graphs showing C*-L* characteristics of object colors, with respect to red, green and blue, respectively.
Figure 9B:
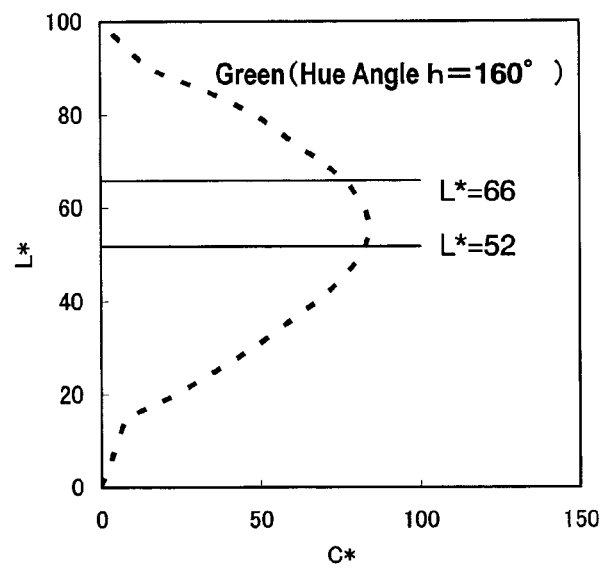
Figure 9C:
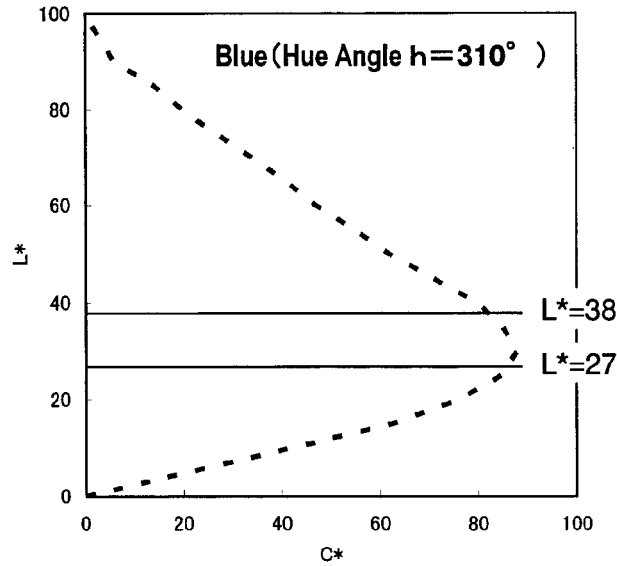

In order to reproduce colors of high chroma, as shown in FIGS. 9A to 9C, it is preferable that: red has an L* of no less than 38 and no more than 54; green has an L* of no less than 52 and no more than 66; and blue has an L* of no less than 27 and no more than 38. Since L* and the Y value satisfy a relationship of $L^*=116 \cdot Y^{1/3}-16$, when this condition is expressed in terms of the Y value instead of L*, it is preferable that: red has a Y value of no less than 10% and no more than 22%; green has a Y value of no less than 20% and no more than 35%; and blue has a Y value of no less than 5% and no more than 10%.

Figure 10A:
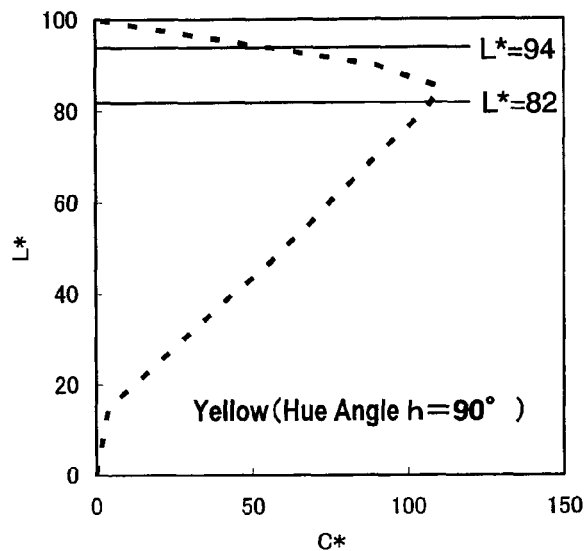
FIGS. 10A, 10B and 10C are graphs showing C*-L* characteristics of object colors, with respect to yellow, cyan and magenta, respectively.
Figure 10B:
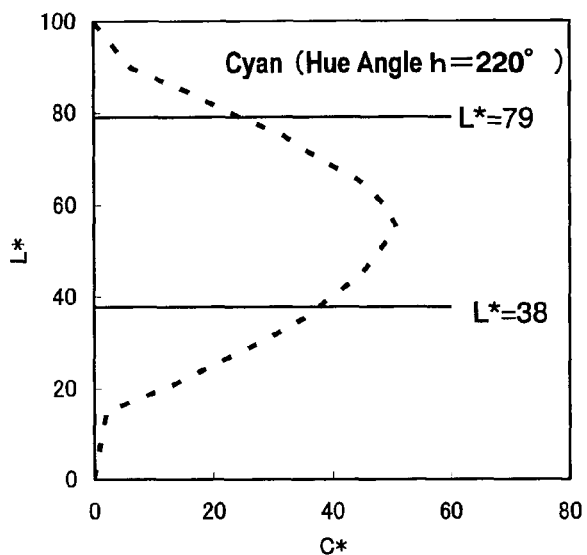
Figure 10C:
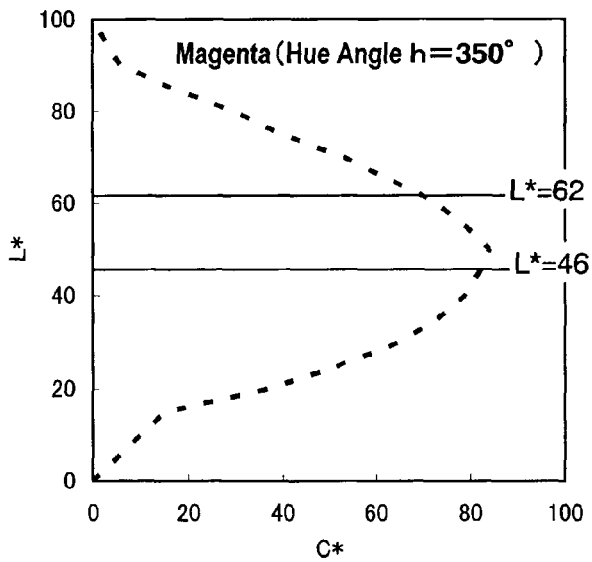

Similarly, in order to reproduce colors of high chroma, as shown in FIGS. 10A to 10C, it is preferable that: yellow has an L* of no less than 82 and no more than 94; cyan has an L* of no less than 38 and no more than 79; and magenta has an L* of no less than 46 and no more than 62. When this condition is expressed in terms of the Y value instead of L*, it is preferable that: yellow has a Y value of no less than 60% and no more than 85%; cyan has a Y value of no less than 10% and no more than 55%; and magenta has a Y value of no less than 15% and no more than 30%.

When the Y value is too low, a blackish color will result even if the chroma may be high. For example, red will appear as scarlet, yellow as ocher, and green or blue as black. Conversely, if the Y value is too high, the display will resemble luminous colors, which would be odd. This tendency is especially true of red and green. As for cyan, a good display quality can be obtained in a relatively broad range of Y values, as can be seen from FIG. 10B.

Table 5 shows preferable ranges for the Y value, dominant wavelength, and color purity of each primary color used for displaying by the liquid crystal display device 100.

TABLE 5

|  | Y value (white display = 100%) | Dominant Wavelength | Color Purity |
| --- | --- | --- | --- |
| R (=R1 + R2) | 10%-22% | 605 nm-635 nm | ≧90% |
| Ye (=R1 + R2 + Ye + G) | 60%-85% | 565 nm-580 nm | 85%-95% |
| G | 20%-35% | 520 nm-550 nm | 65%-80% |
| C (=G + C + B) | 10%-55% | 475 nm-500 nm | 65%-80% |
| B | 5%-10% | ≦470 nm | 90%-95% |
| M (=R1 + R2 + B) | 15%-30% |  | 60%-80% |

As has already been described, it is preferable that: red has a Y value of no less than 10% and no more than 22%; green has a Y value of no less than 20% and no more than 35%; blue has a Y value of no less than 5% and no more than 10%; yellow has a Y value of no less than 60% and no more than 85%; cyan has a Y value of no less than 10% and no more than 55%; and magenta has a Y value of no less than 15% and no more than 30%.

Moreover, it is preferable that: red has a dominant wavelength of no less than 605 nm and no more than 635 nm; green has a dominant wavelength of no less than 520 nm and no more than 550 nm; blue has a dominant wavelength of no more than 470 nm; yellow has a dominant wavelength of no less than 565 nm and no more than 580 nm; and cyan has a dominant wavelength of no less than 475 nm and no more than 500 nm.

Furthermore, it is preferable that: red has a color purity of no less than 90%; green has a color purity of no less than 65% and no more than 80%; blue has a color purity of no less than 90% and no more than 95%; yellow has a color purity of no less than 85% and no more than 95%; cyan has a color purity of no less than 65% and no more than 80%; and magenta has a color purity of no less than 60% and no more than 80%.

As for red, the first and second red subpixels R1 and R2 contribute to display. As for yellow, the first and second red subpixels R1 and R2, the yellow subpixel Ye, and the green subpixel G contribute to display. As for cyan, the green subpixel G, the cyan subpixel C, and the blue subpixel B contribute to display. As for magenta, the first and second red subpixels R1 and R2 and the blue subpixel B contribute to display. When these facts are taken into consideration, the preferable ranges for the dominant wavelength, Y value, and color purity of each subpixel of the liquid crystal display device 100 are as shown in Table 6.

TABLE 6

|  | Y value (white display = 100%) | Dominant Wavelength | Color Purity |
| --- | --- | --- | --- |
| R1•R2 | 5%-11% | 605 nm-635 nm | ≧90% |
| Ye | 30%-50% | 565 nm-580 nm | 85%-95% |
| G | 20%-35% | 520 nm-550 nm | 65%-80% |
| C | 10%-30% | 475 nm-500 nm | 65%-80% |
| B | 5%-10% | ≦470 nm | 90%-95% |

As shown in Table 6, it is preferable that: the first and second red subpixels R1 and R2 each have a Y value of no less than 5% and no more than 11%; the green subpixel G has a Y value of no less than 20% and no more than 35%; the blue subpixel B has a Y value of no less than 5% and no more than 10%; the yellow subpixel Ye has a Y value of no less than 30% and no more than 50%; and the cyan subpixel C has a Y value of no less than 10% and no more than 30%.

Moreover, it is preferable that: the first and second red subpixels R1 and R2 each have a dominant wavelength of no less than 605 nm and no more than 635 nm; the green subpixel G has a dominant wavelength of no less than 520 nm and no more than 550 nm; the blue subpixel B has a dominant wavelength of no more than 470 nm; the yellow subpixel Ye has a dominant wavelength of no less than 565 nm and no more than 580 nm; and the cyan subpixel C has a dominant wavelength of no less than 475 nm and no more than 500 nm.

Furthermore, it is preferable that: the first and second red subpixels R1 and R2 each have a color purity of no less than 90%; the green subpixel G has a color purity of no less than 65% and no more than 80%; the blue subpixel B has a color purity of no less than 90% and no more than 95%; the yellow subpixel Ye has a color purity of no less than 85% and no more than 95%; and the cyan subpixel C has a color purity of no less than 65% and no more than 80%.

By prescribing the Y value, dominant wavelength, and color purity of each subpixel so as to be within the aforementioned preferable ranges, it becomes possible to enhance the effects of the present invention of expanding the color gamut and enabling displaying of bright red.

The inventors have produced a number of prototypes of the liquid crystal display device 100 according to the present preferred embodiment, with varying color filter and backlight specifications. These prototypes exhibited display qualities as follows. The display quality results will be shown in Tables 7 to 20 below. It must be noted that each display quality rating recited in any of Tables 7, 9, 11, 13, 15, 17 and 19 is a "display quality of a subpixel", whereas each display quality rating recited in any of Tables 8, 10, 12, 14, 16, 18 and 20 is a "display quality of a primary color".

Example 1

Figure 11:
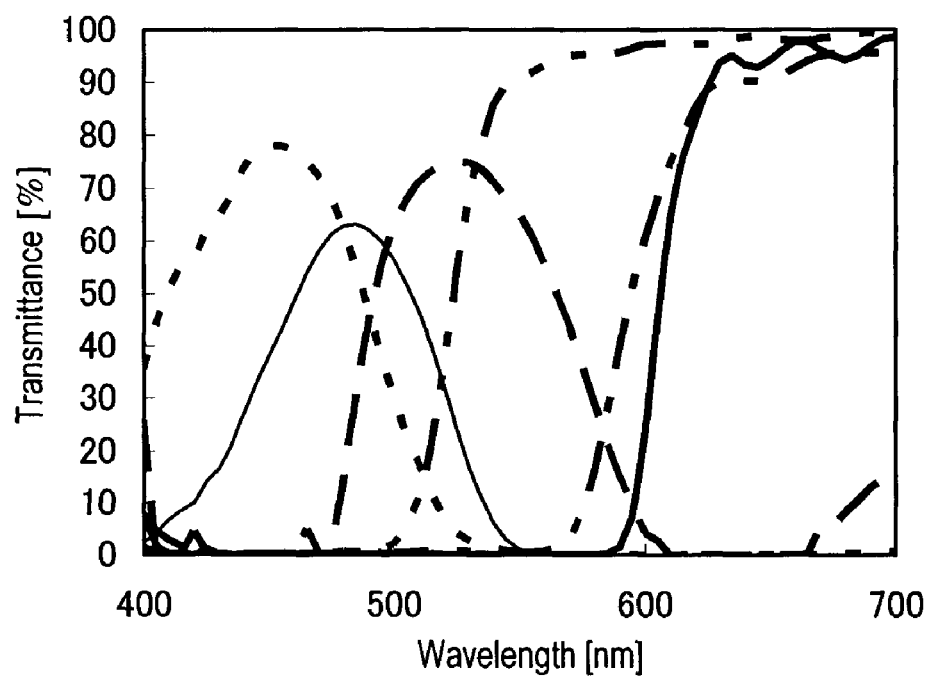
FIG. 11 is a graph showing spectral transmittance characteristics of a color filter corresponding to Example 1.
Figure 12:
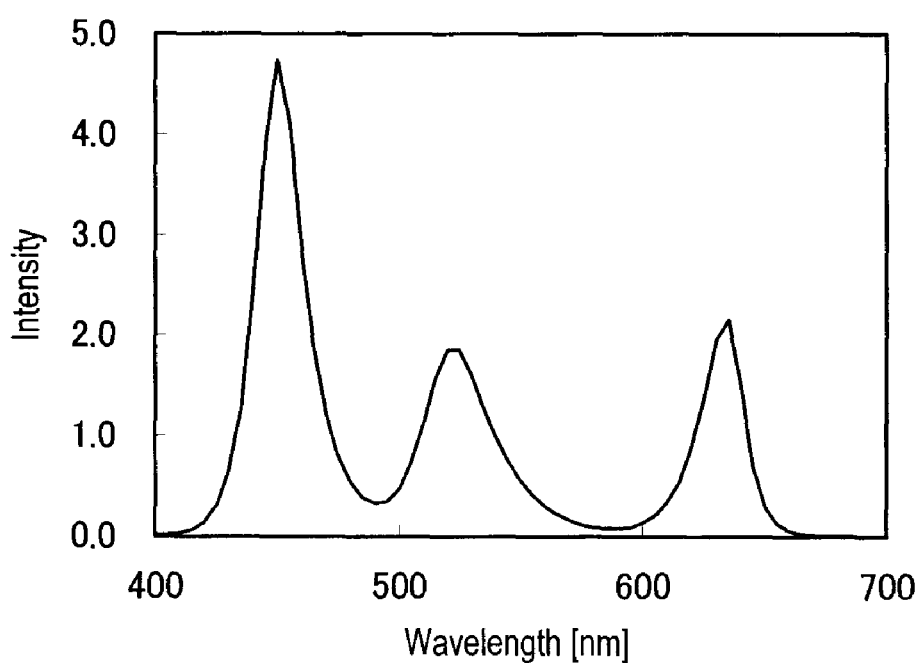
FIG. 12 is a graph showing a backlight spectrum corresponding to Example 1.

Table 7 shows the Y value, xy chromaticity, dominant wavelength, color purity, and display quality of each subpixel in this Example. Table 8 shows the Y value, xy chromaticity, dominant wavelength (or complementary wavelength for magenta), color purity, and display quality of each primary color in this Example. Moreover, spectral transmittance characteristics of color filters and a backlight spectrum in this Example are shown in FIGS. 11 and 12.

As seen from Table 7, the Y value, dominant wavelength, and color purity of each subpixel are generally within the preferable value ranges as shown in Table 6. Therefore, as seen from Table 8, the Y value, dominant wavelength, and color purity of each primary color are generally within the preferable value ranges as shown in Table 5. As a result, a very good display quality was obtained with respect to all primary colors.

TABLE 7

|  | W | R1 | R2 | Ye | G | C | B |
|---|---|---|---|---|---|---|---|
| Y [%] | 100 | 8.8 | 9.5 | 36.2 | 30.0 | 10.3 | 5.6 |
| x | 0.293 | 0.684 | 0.677 | 0.461 | 0.167 | 0.136 | 0.149 |
| y | 0.273 | 0.293 | 0.305 | 0.517 | 0.722 | 0.140 | 0.045 |
| Dominant Wavelength [nm] | 9103* | 630 | 620 | 574 | 526 | 477 | 450 |
| Color Purity [%] |  | 94 | 96 | 94 | 79 | 85 | 95 |
| Display Quality |  | X | X | X | ◎ | ○ | ○ |

*Color Temperature (K)

TABLE 8

|  | W | R* | Ye* | G | C* | B | M* |
|---|---|---|---|---|---|---|---|
| Y [%] | 100 | 18.2 | 74.7 | 30.0 | 45.5 | 5.6 | 23.7 |
| x | 0.293 | 0.684 | 0.423 | 0.167 | 0.148 | 0.149 | 0.327 |
| y | 0.273 | 0.299 | 0.531 | 0.722 | 0.192 | 0.045 | 0.129 |
| Dominant Wavelength [nm] |  | 625 | 596 | 526 | 481 | 450 | 555† |
| Color Purity [%] |  | 96 | 87 | 79 | 75 | 95 | 79 |
| Display Quality |  | ◎ | ◎ | ◎ | ◎ | ◎ | ◎ |

*R = R1 + R2
*Ye = R1 + R2 + Ye + G
*C = G + C + B
*M = R1 + R2 + B
†Complementary Wavelength (nm)

Example 2

Figure 13:
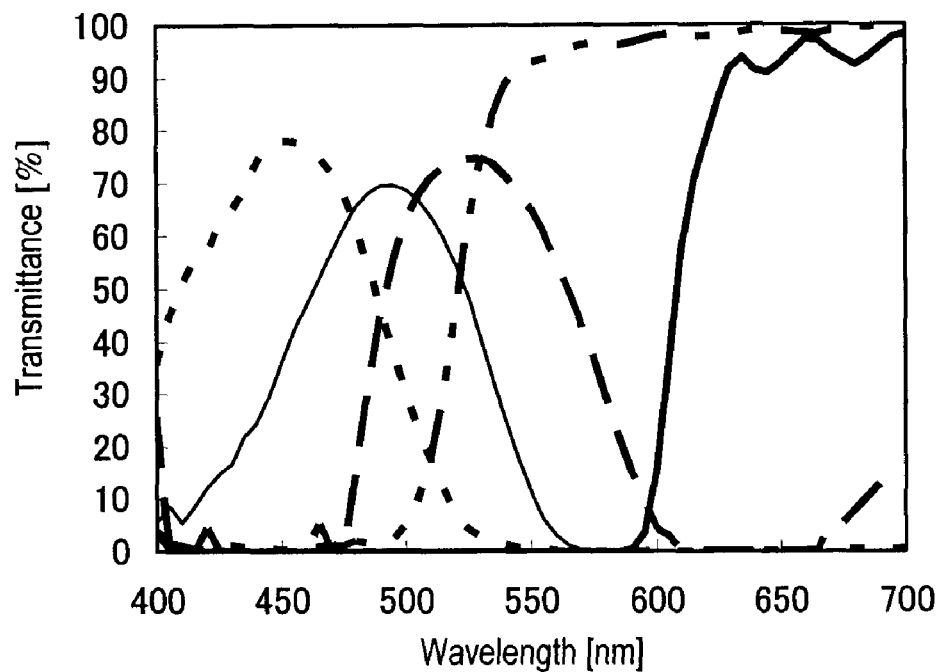
FIG. 13 is a graph showing spectral transmittance characteristics of a color filter corresponding to Example 2.
Figure 14:
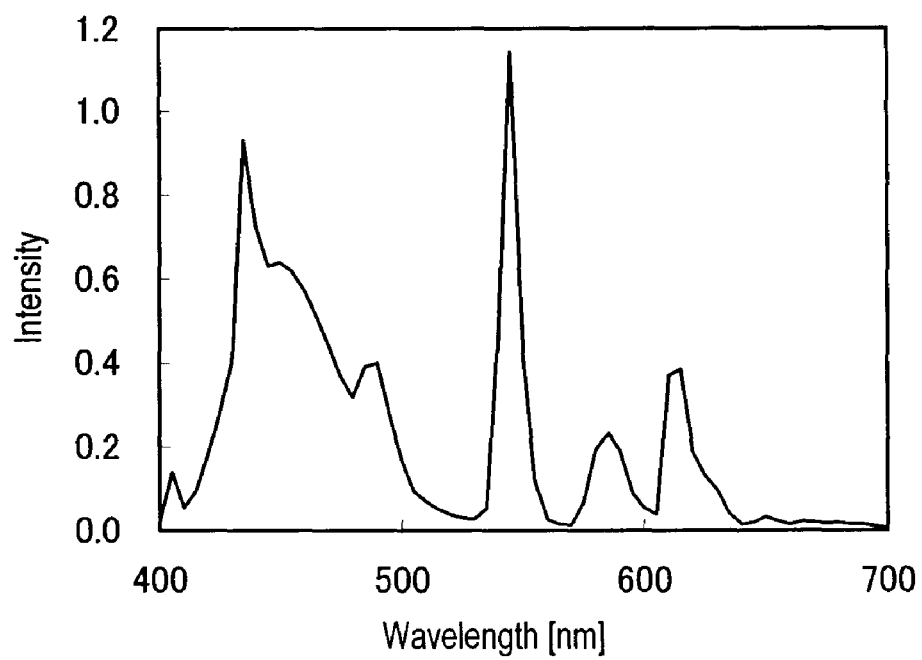
FIG. 14 is a graph showing a backlight spectrum corresponding to Example 2.

Table 9 shows the Y value and other parameters of each subpixel in this Example, and Table 10 shows the Y value and other parameters of each primary color in this Example. Moreover, spectral transmittance characteristics of color filters and a backlight spectrum in this Example are shown in FIGS. 13 and 14.

As seen from Table 9, the Y value, dominant wavelength, and color purity of each subpixel are generally within the preferable value ranges as shown in Table 6. Therefore, as seen from Table 10, the Y value, dominant wavelength, and color purity of each primary color are generally within the preferable value ranges as shown in Table 5. As a result, a very good display quality was obtained with respect to red, green, yellow, and cyan; and a good display quality was obtained with respect to blue and magenta.

TABLE 9

|  | W | R1 | R1 | Ye | G | C | B |
|---|---|---|---|---|---|---|---|
| Y [%] | 100 | 5.3 | 5.3 | 46.0 | 27.2 | 11.6 | 5.1 |
| x | 0.284 | 0.673 | 0.673 | 0.441 | 0.251 | 0.143 | 0.146 |
| y | 0.294 | 0.315 | 0.315 | 0.538 | 0.625 | 0.165 | 0.047 |
| Dominant Wavelength [nm] | 9306* | 617 | 617 | 570 | 537 | 478 | 463 |
| Color Purity [%] |  | 97 | 97 | 93 | 67 | 79 | 96 |
| Display Quality |  | X | X | X | ◉ | ○ | ○ |

*Color Temperature (K)

TABLE 10

|  | W | R* | Ye* | G | C* | B | M* |
|---|---|---|---|---|---|---|---|
| Y [%] | 100 | 10.6 | 83.5 | 27.2 | 43.6 | 5.1 | 15.6 |
| x | 0.284 | 0.673 | 0.439 | 0.251 | 0.165 | 0.146 | 0.270 |
| y | 0.294 | 0.315 | 0.517 | 0.625 | 0.196 | 0.047 | 0.109 |
| Dominant Wavelength [nm] |  | 617 | 572 | 537 | 480 | 463 | 569† |
| Color Purity [%] |  | 97 | 88 | 67 | 69 | 96 | 78 |
| Display Quality |  | ◉ | ◉ | ◉ | ◉ | ○ | ○ |

*R = R1 + R2
*Ye = R1 + R2 + Ye + G
*C = G + C + B
*M = R1 + R2 + B
†Complementary Wavelength (nm)

Example 3

Figure 15:
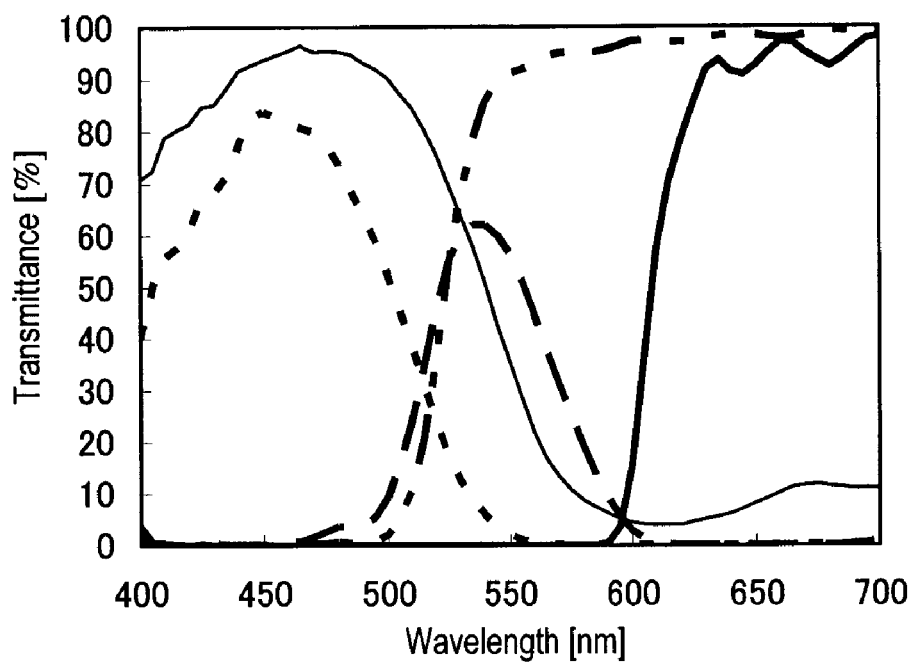
FIG. 15 is a graph showing spectral transmittance characteristics of a color filter corresponding to Example 3.
Figure 16:
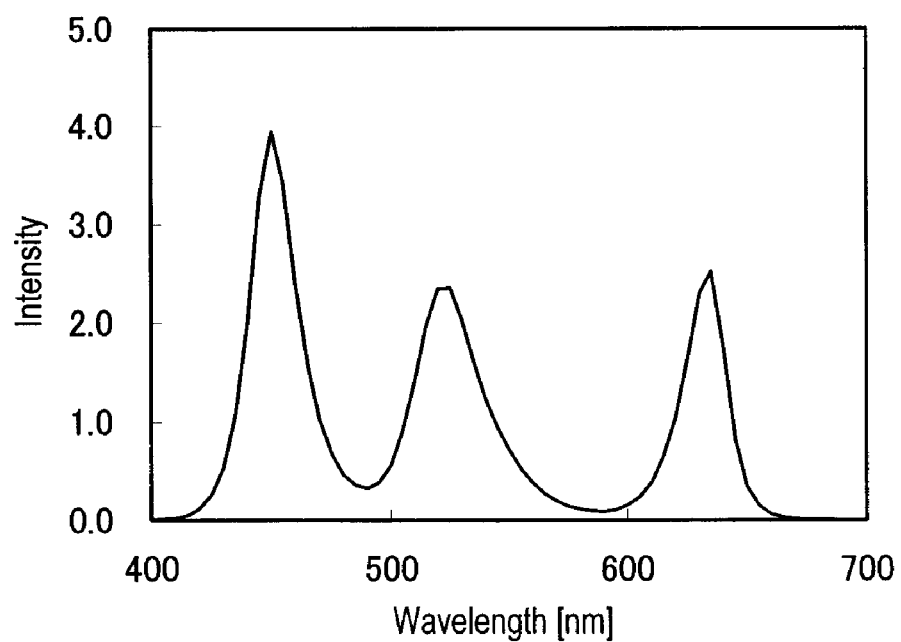
FIG. 16 is a graph showing a backlight spectrum corresponding to Example 3.

Table 11 shows the Y value and other parameters of each subpixel in this Example, and Table 12 shows the Y value and other parameters of each primary color in this Example. Moreover, spectral transmittance characteristics of color filters and a backlight spectrum in this Example are shown in FIGS. 15 and 16.

As seen from Table 11, the Y value, dominant wavelength, and color purity of each subpixel are generally within the preferable value ranges as shown in Table 6. Therefore, as seen from Table 12, the Y value, dominant wavelength, and color purity of each primary color are generally within the preferable value ranges as shown in Table 5. As a result, a very good display quality was obtained with respect to red, yellow, cyan, and magenta; and a good display quality was obtained with respect to green and blue.

TABLE 11

|  | W | R1 | R1 | Ye | G | C | B |
|---|---|---|---|---|---|---|---|
| Y [%] | 100 | 7.1 | 7.1 | 32.5 | 19.3 | 26.3 | 8.3 |
| x | 0.283 | 0.697 | 0.697 | 0.452 | 0.191 | 0.153 | 0.144 |
| y | 0.293 | 0.296 | 0.296 | 0.526 | 0.739 | 0.216 | 0.096 |
| Dominant Wavelength [nm] | 9454* | 627 | 627 | 572 | 532 | 482 | 471 |
| Color Purity [%] |  | 98 | 98 | 94 | 88 | 71 | 89 |
| Display Quality |  | X | X | X | ○ | ◉ | ◉ |

*Color Temperature (K)

TABLE 12

|   | W | R* | Ye* | G | C* | B | M* |
|---|---|---|---|---|---|---|---|
| Y [%] | 100 | 14.2 | 65.7 | 19.3 | 53.6 | 8.3 | 22.3 |
| x | 0.283 | 0.697 | 0.490 | 0.191 | 0.153 | 0.144 | 0.342 |
| y | 0.293 | 0.296 | 0.487 | 0.739 | 0.230 | 0.096 | 0.167 |
| Dominant Wavelength [nm] | | 627 | 578 | 532 | 484 | 471 | 553† |
| Color Purity [%] | | 98 | 93 | 88 | 70 | 89 | 66 |
| Display Quality | | ◉ | ◉ | ○ | ◉ | ○ | ◉ |

*R = R1 + R2
*Ye = R1 + R2 + Ye + G
*C = G + C + B
*M = R1 + R2 + B
†Complementary Wavelength (nm)

Example 4

Figure 17:
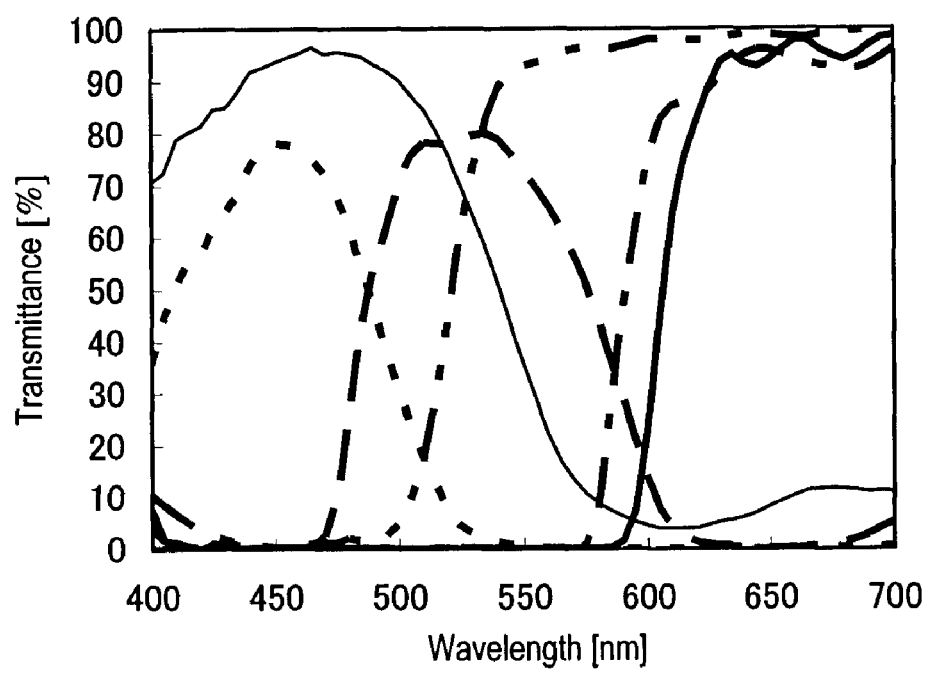
FIG. 17 is a graph showing spectral transmittance characteristics of a color filter corresponding to Example 4.
Figure 18:
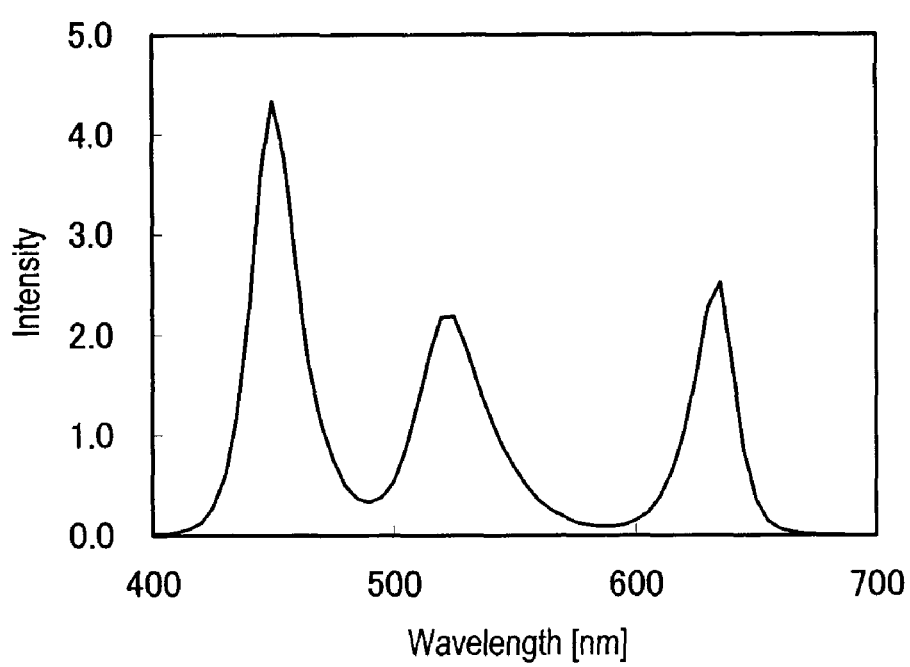
FIG. 18 is a graph showing a backlight spectrum corresponding to Example 4.

Table 13 shows the Y value and other parameters of each subpixel in this Example, and Table 14 shows the Y value and other parameters of each primary color in this Example. Moreover, spectral transmittance characteristics of color filters and a backlight spectrum in this Example are shown in FIGS. 17 and 18.

As seen from Table 13, the Y value, dominant wavelength, and color purity of each subpixel are generally within the preferable value ranges as shown in Table 6. Therefore, as seen from Table 14, the Y value, dominant wavelength, and color purity of each primary color are generally within the preferable value ranges as shown in Table 5. As a result, a very good display quality was obtained with respect to red, green, yellow, cyan, and magenta; and a good display quality was obtained with respect to blue.

TABLE 13

|   | W | R1 | R2 | Ye | G | C | B |
|---|---|---|---|---|---|---|---|
| Y [%] | 100 | 7.1 | 7.8 | 31.3 | 26.7 | 23.3 | 4.0 |
| x | 0.284 | 0.685 | 0.678 | 0.444 | 0.178 | 0.153 | 0.148 |
| y | 0.294 | 0.295 | 0.298 | 0.525 | 0.717 | 0.192 | 0.051 |
| Dominant Wavelength [nm] | 9855* | 625 | 625 | 572 | 527 | 481 | 463 |
| Color Purity [%] | | 96 | 94 | 91 | 79 | 74 | 95 |
| Display Quality | | X | X | X | ◉ | ○ | ○ |

*Color Temperature (K)

TABLE 14

|   | W | R* | Ye* | G | C* | B | M* |
|---|---|---|---|---|---|---|---|
| Y [%] | 100 | 14.8 | 64.9 | 26.7 | 53.7 | 4.0 | 18.6 |
| x | 0.284 | 0.685 | 0.411 | 0.178 | 0.155 | 0.148 | 0.357 |
| y | 0.294 | 0.296 | 0.540 | 0.717 | 0.228 | 0.051 | 0.146 |
| Dominant Wavelength [nm] | | 625 | 567 | 527 | 484 | 463 | 547† |
| Color Purity [%] | | 96 | 86 | 79 | 69 | 95 | 77 |
| Display Quality | | ◉ | ◉ | ◉ | ◉ | ○ | ◉ |

*R = R1 + R2
*Ye = R1 + R2 + Ye + G
*C = G + C + B
*M = R1 + R2 + B
†Complementary Wavelength (nm)

Example 5

Figure 19:
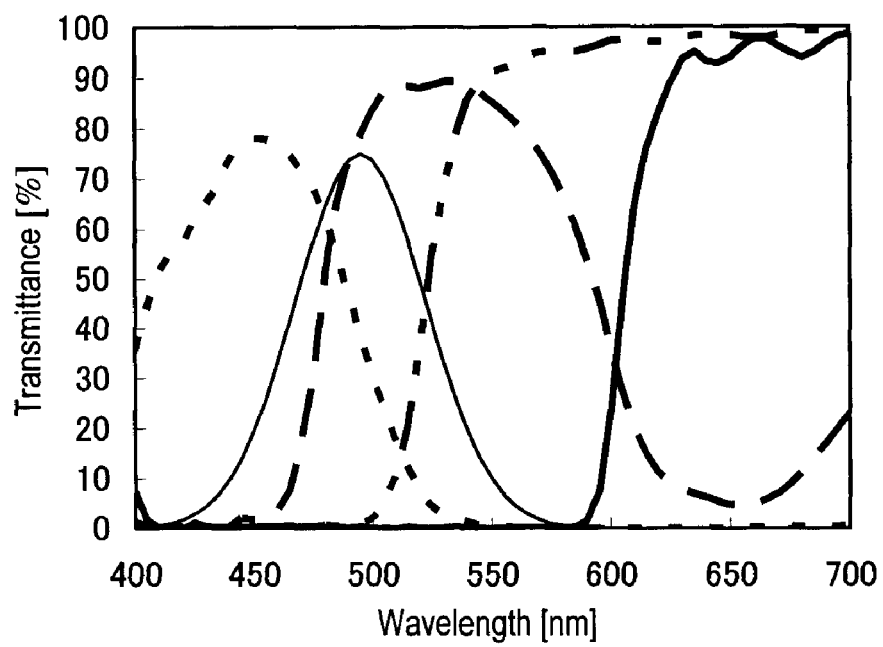
FIG. 19 is a graph showing spectral transmittance characteristics of a color filter corresponding to Example 5.
Figure 20:
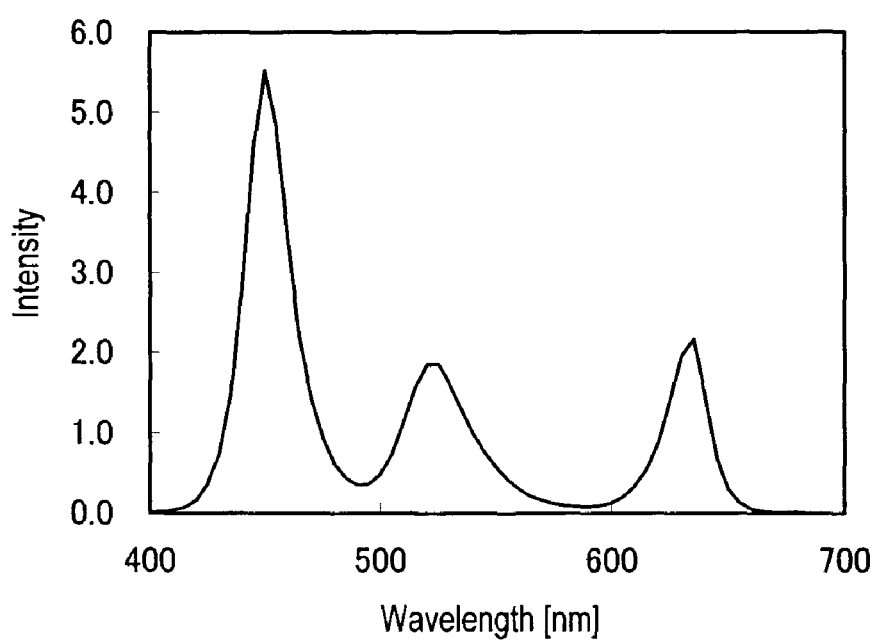
FIG. 20 is a graph showing a backlight spectrum corresponding to Example 5.

Table 15 shows the Y value and other parameters of each subpixel in this Example, and Table 16 shows the Y value and other parameters of each primary color in this Example. Moreover, spectral transmittance characteristics of color filters and a backlight spectrum in this Example are shown in FIGS. 19 and 20.

As seen from Table 15, the Y value, dominant wavelength, and color purity of each subpixel are generally within the preferable value ranges as shown in Table 6. Therefore, as seen from Table 16, the Y value, dominant wavelength, and color purity of each primary color are generally within the preferable value ranges as shown in Table 5. As a result, a very good display quality was obtained with respect to red, blue, yellow, cyan, and magenta; and a good display quality was obtained with respect to green.

TABLE 15

|  | W | R1 | R1 | Ye | G | C | B |
|---|---|---|---|---|---|---|---|
| Y [%] | 100 | 7.6 | 7.6 | 31.3 | 34.8 | 14.2 | 5.3 |
| x | 0.281 | 0.685 | 0.685 | 0.461 | 0.206 | 0.131 | 0.149 |
| y | 0.289 | 0.293 | 0.293 | 0.517 | 0.595 | 0.254 | 0.043 |
| Dominant Wavelength [nm] | 9052* | 630 | 630 | 573 | 522 | 489 | 460 |
| Color Purity [%] |  | 94 | 94 | 93 | 53 | 75 | 76 |
| Display Quality |  | X | X | X | ○ | ○ | ◎ |

*Color Temperature (K)

TABLE 16

|  | W | R* | Ye* | G | C* | B | M* |
|---|---|---|---|---|---|---|---|
| Y [%] | 100 | 15.1 | 80.9 | 34.8 | 53.9 | 5.3 | 20.2 |
| x | 0.281 | 0.685 | 0.442 | 0.206 | 0.158 | 0.149 | 0.308 |
| y | 0.289 | 0.293 | 0.477 | 0.595 | 0.229 | 0.043 | 0.117 |
| Dominant Wavelength [nm] |  | 630 | 578 | 522 | 484 | 460 | 559† |
| Color Purity [%] |  | 94 | 93 | 53 | 68 | 96 | 79 |
| Display Quality |  | ◎ | ◎ | ○ | ◎ | ◎ | ◎ |

*R = R1 + R2
*Ye = R1 + R2 + Ye + G
*C = G + C + B
*M = R1 + R2 + B
†Complementary Wavelength (nm)

Example 6

Figure 21:
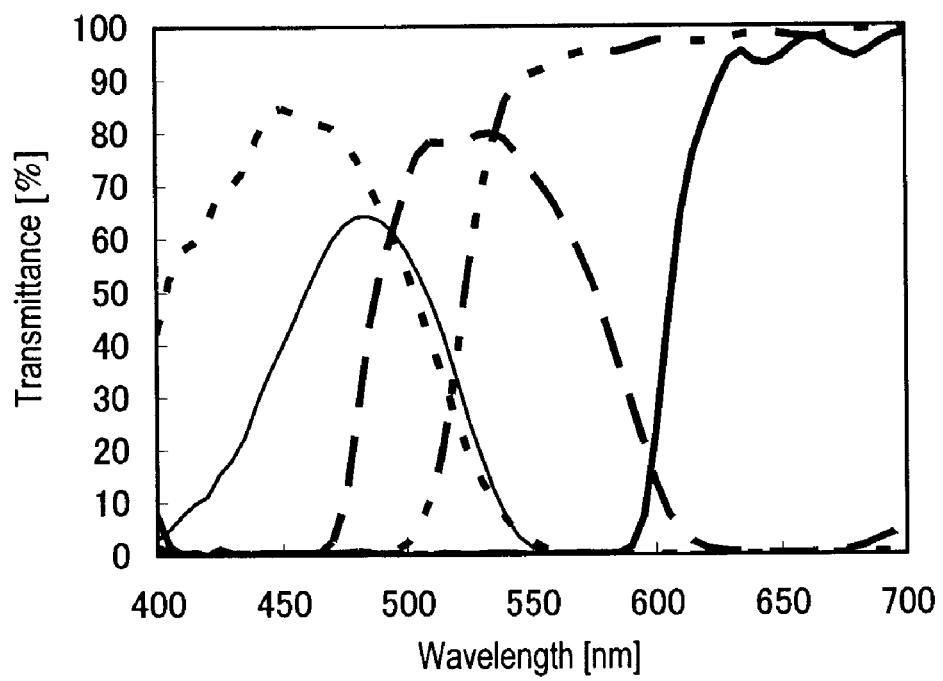
FIG. 21 is a graph showing spectral transmittance characteristics of a color filter corresponding to Example 6.
Figure 22:
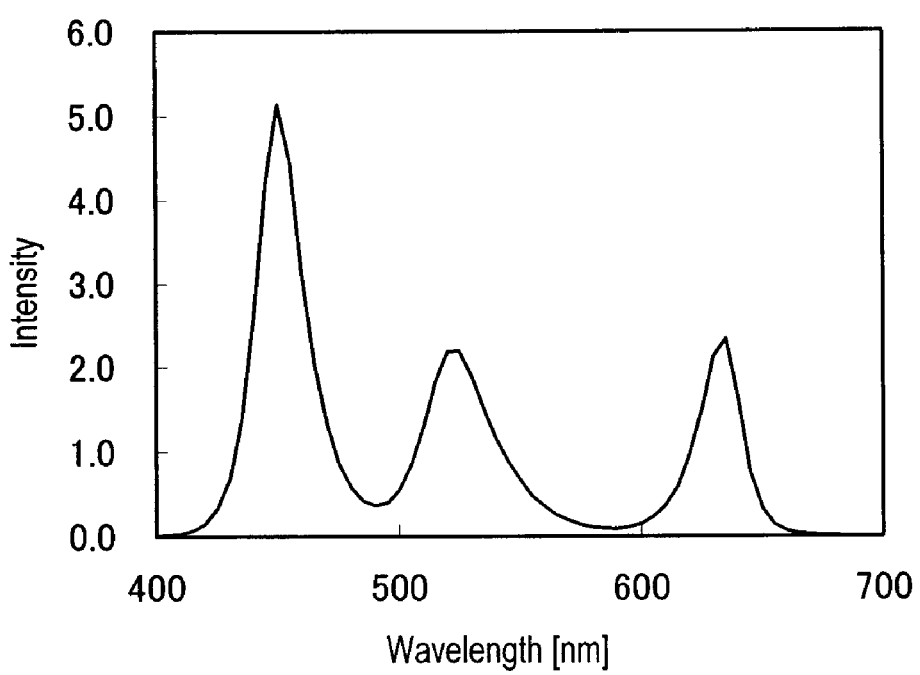
FIG. 22 is a graph showing a backlight spectrum corresponding to Example 6.

Table 17 shows the Y value and other parameters of each subpixel in this Example, and Table 18 shows the Y value and other parameters of each primary color in this Example. Moreover, spectral transmittance characteristics of color filters and a backlight spectrum in this Example are shown in FIGS. 21 and 22.

As seen from Table 17, the Y value, dominant wavelength, and color purity of each subpixel are generally within the preferable value ranges as shown in Table 6. Therefore, as seen from Table 18, the Y value, dominant wavelength, and color purity of each primary color are generally within the preferable value ranges as shown in Table 5. As a result, a very good display quality was obtained with respect to red, green, yellow, and magenta; and a good display quality was obtained with respect to blue and cyan.

TABLE 17

|  | W | R1 | R1 | Ye | G | C | B |
|---|---|---|---|---|---|---|---|
| Y [%] | 100 | 7.7 | 7.7 | 33.6 | 31.2 | 10.4 | 10.0 |
| x |  0.284 | 0.687 | 0.687 | 0.451 | 0.176 | 0.137 | 0.146 |
| Y |  0.286 | 0.295 | 0.295 | 0.526 | 0.714 | 0.150 | 0.082 |
| Dominant Wavelength [nm] | 9671* | 625 | 625 | 572 | 527 | 478 | 469 |
| Color Purity [%] |  | 96 | 96 | 93 | 78 | 84 | 90 |
| Display Quality |  | X | X | X | ◎ | ○ | ○ |

*Color Temperature (K)

TABLE 18

|  | W | R* | Ye* | G | C* | B | M* |
|---|---|---|---|---|---|---|---|
| Y [%] | 100 | 15.3 | 79.9 | 31.2 | 51.4 | 10.0 | 25.2 |
| x | 0.286 | 0.687 | 0.454 | 0.176 | 0.148 | 0.146 | 0.308 |
| y | 0.287 | 0.294 | 0.503 | 0.714 | 0.219 | 0.082 | 0.145 |
| Dominant Wavelength [nm] |  | 620 | 578 | 527 | 483 | 469 | 560† |
| Color Purity [%] |  | 96 | 89 | 78 | 72 | 90 | 69 |
| Display Quality |  | ◎ | ◎ | ◎ | ○ | ○ | ◎ |

*R = R1 + R2
*Ye = R1 + R2 + Ye + G
*C = G + C + B
*M = R1 + R2 + B
†Complementary Wavelength (nm)

Example 7

Figure 23:
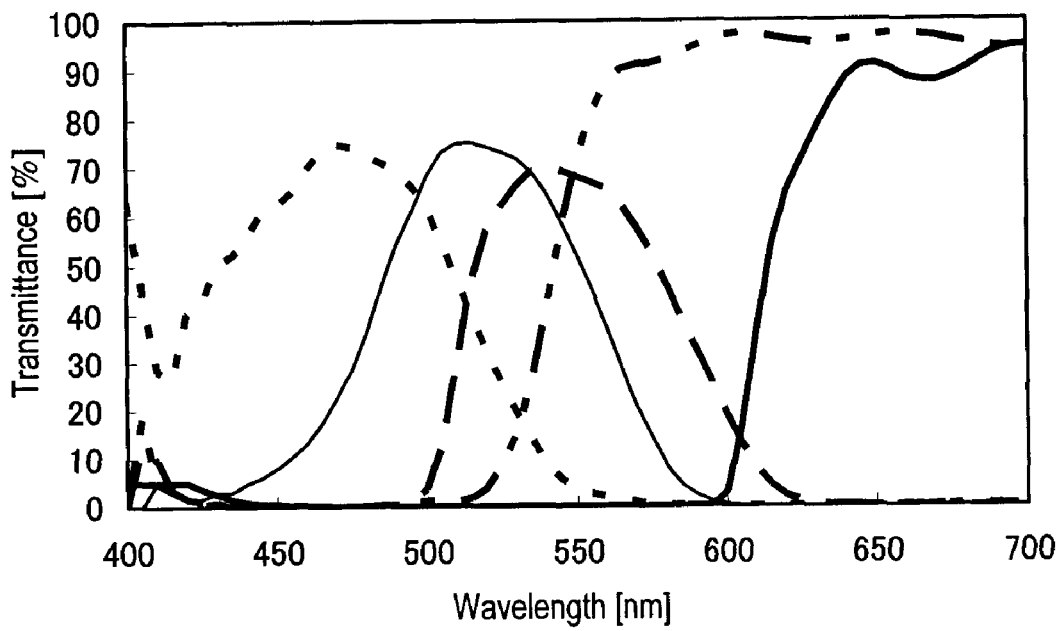
FIG. 23 is a graph showing spectral transmittance characteristics of a color filter corresponding to Example 7.
Figure 24:
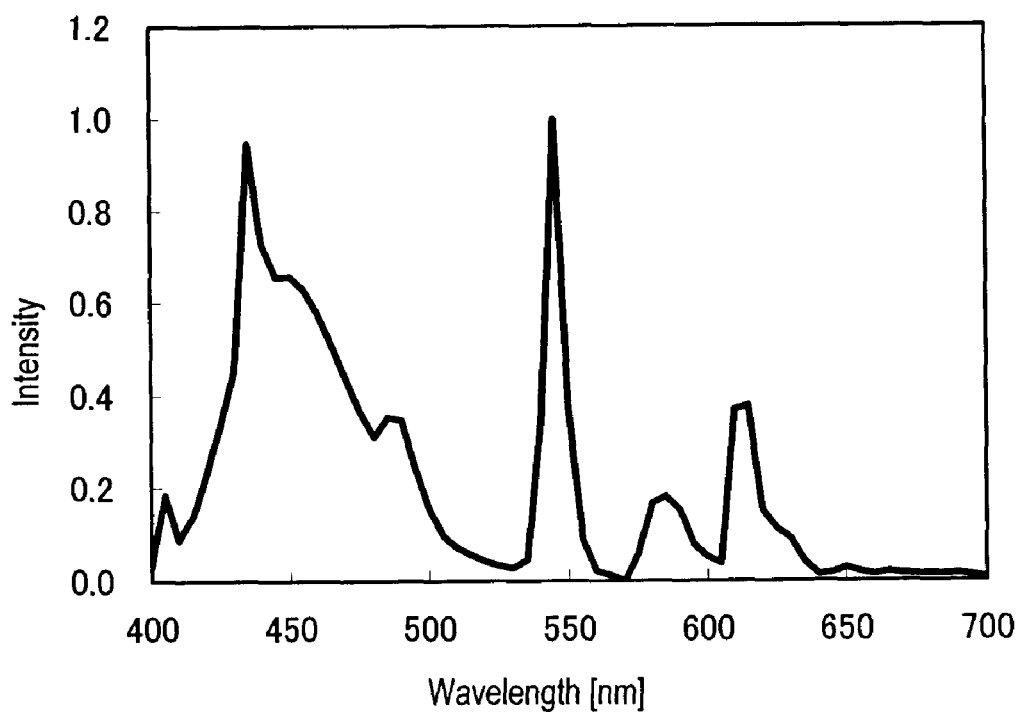
FIG. 24 is a graph showing a backlight spectrum corresponding to Example 7.

Table 19 shows the Y value and other parameters of each subpixel in this Example, and Table 20 shows the Y value and other parameters of each primary color in this Example. Moreover, spectral transmittance characteristics of color filters and a backlight spectrum in this Example are shown in FIGS. 23 and 24.

As seen from Table 19, the Y value, dominant wavelength, and color purity of each subpixel are generally within the preferable value ranges as shown in Table 6. Therefore, as seen from Table 20, the Y value, dominant wavelength, and color purity of each primary color are generally within the preferable value ranges as shown in Table 5. As a result, a very good display quality was obtained with respect to green, yellow, blue, cyan and magenta; and a good display quality was obtained with respect to red.

TABLE 19

|  | W | R1 | R1 | Ye | G | C | B |
|---|---|---|---|---|---|---|---|
| Y [%] | 100 | 8.2 | 8.2 | 42.2 | 22.1 | 14.6 | 5.5 |
| x |  0.299 | 0.655 | 0.655 | 0.449 | 0.246 | 0.146 | 0.147 |
| Y |  0.294 | 0.337 | 0.334 | 0.535 | 0.651 | 0.225 | 0.047 |
| Dominant Wavelength [nm] | 7953* | 609 | 610 | 572 | 538 | 483 | 462 |
| Color Purity [%] |  | 97 | 97 | 96 | 73 | 71 | 97 |
| Display Quality |  | X | X | X | ◎ | ◎ | ◎ |

*Color Temperature (K)

TABLE 20

|  | W | R* | Ye* | G | C* | B | M* |
|---|---|---|---|---|---|---|---|
| Y [%] | 100 | 16.5 | 80.3 | 22.1 | 41.7 | 5.3 | 21.7 |
| x | 0.299 | 0.655 | 0.471 | 0.246 | 0.161 | 0.146 | 0.298 |
| y | 0.294 | 0.337 | 0.500 | 0.651 | 0.395 | 0.047 | 0.132 |
| Dominant Wavelength [nm] |  | 609 | 576 | 538 | 480 | 462 | 560† |
| Color Purity [%] |  | 88 | 91 | 73 | 70 | 96 | 73 |
| Display Quality |  | ○ | ◎ | ◎ | ◎ | ◎ | ◎ |

*R = R1 + R2
*Ye = R1 + R2 + Ye + G
*C = G + C + B
*M = R1 + R2 + B
†Complementary Wavelength (nm)

Example 8

Figure 25:
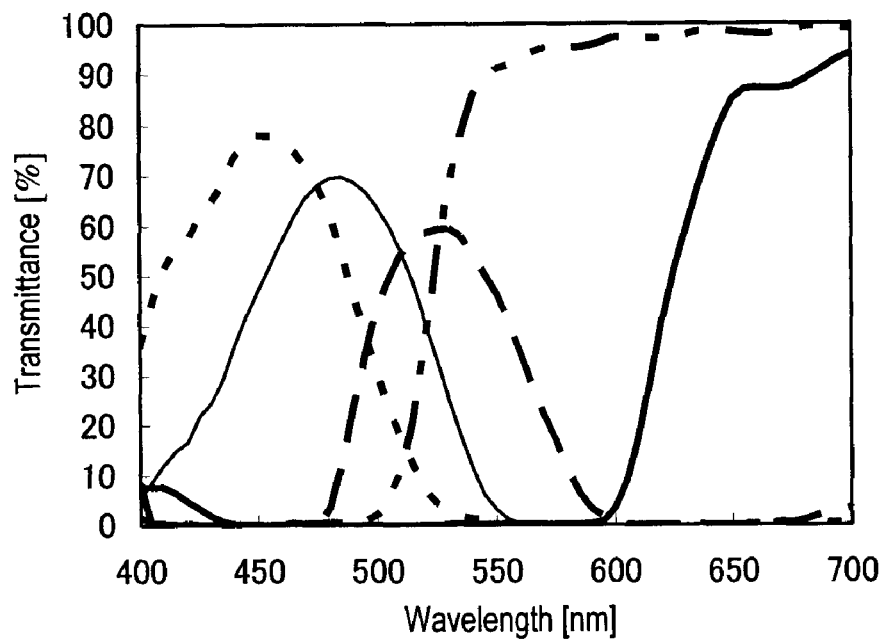
FIG. 25 is a graph showing spectral transmittance characteristics of a color filter corresponding to Example 8.
Figure 26:
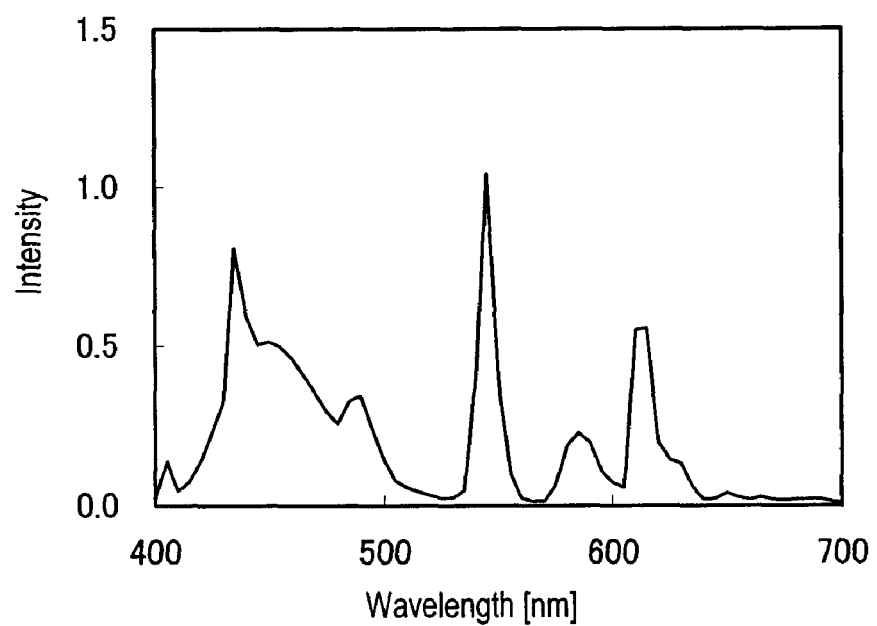
FIG. 26 is a graph showing a backlight spectrum corresponding to Example 8.
Figure 27A:
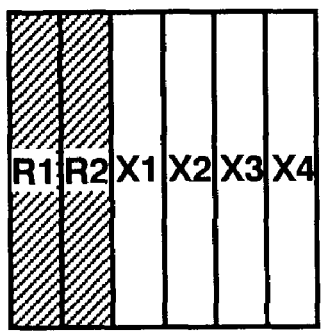
FIGS. 27A, 27B, 27C, 27D and 27E are diagrams showing preferable examples of subpixel arrangement.
Figure 27D:
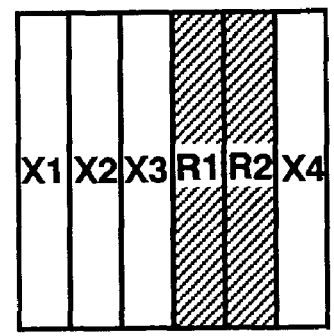
Figure 27B:
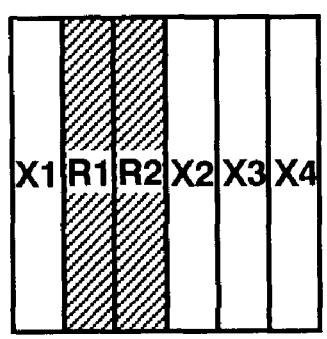
Figure 27E:
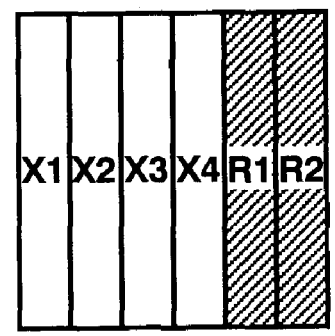
Figure 27C:
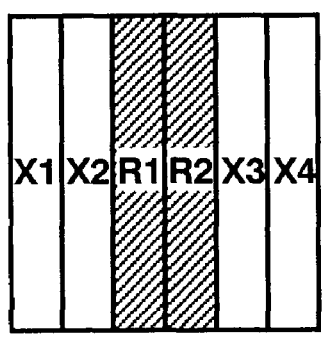
Figure 28A:
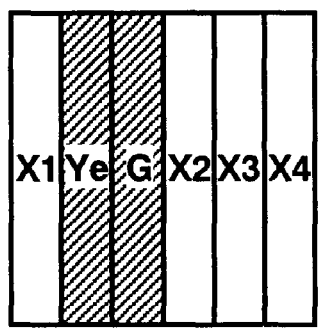
FIGS. 28A, 28B, 28C, 28D, 28E and 28F are diagrams showing preferable examples of subpixel arrangement.
Figure 28D:
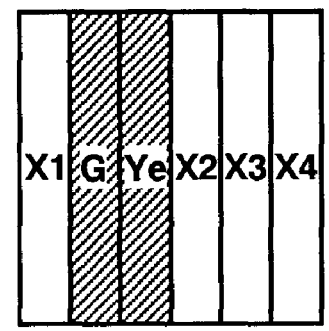
Figure 28B:
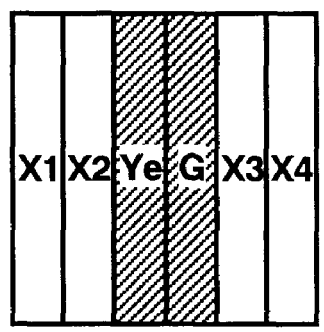
Figure 28E:
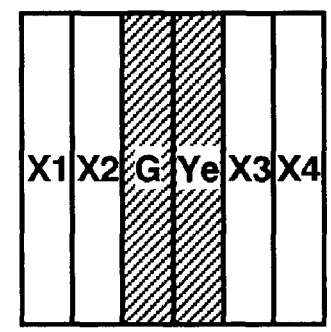
Figure 28C:
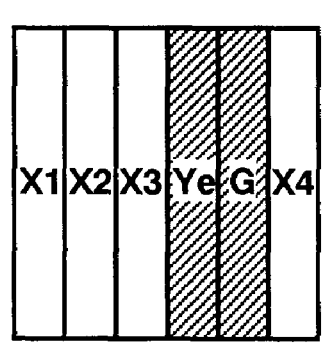
Figure 28F:
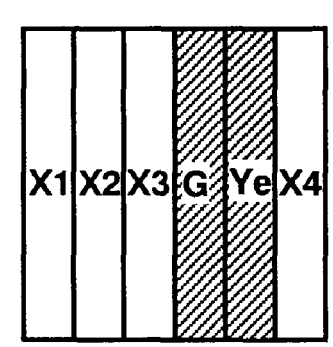
Figure 29A:
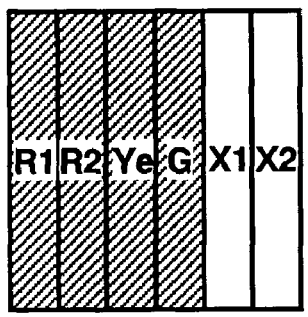
FIGS. 29A, 29B, 29C, 29D, 29E and 29F are diagrams showing preferable examples of subpixel arrangement.
Figure 29D:
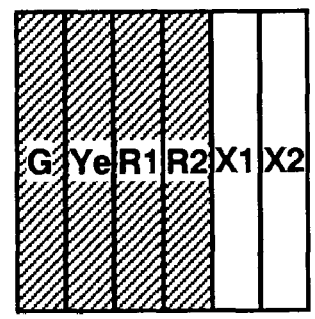
Figure 29B:
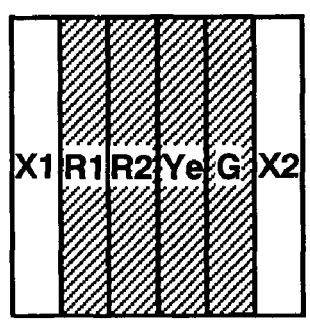
Figure 29E:
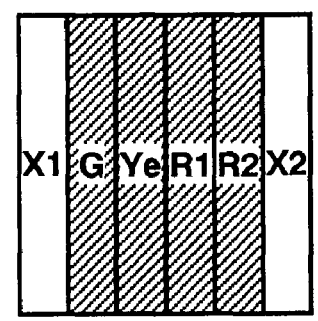
Figure 29C:
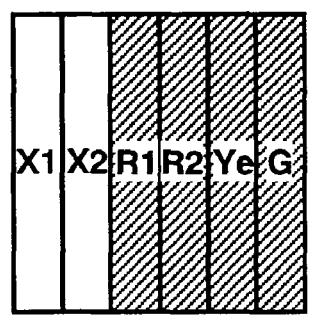
Figure 29F:
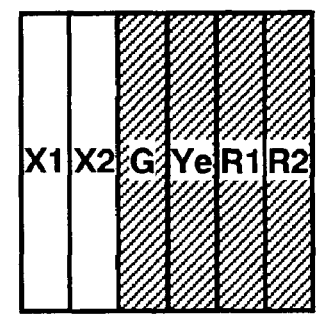
Figure 30A:
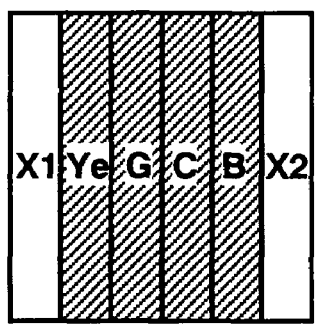
FIGS. 30A, 30B, 30C and 30D are diagrams showing preferable examples of subpixel arrangement.
Figure 30C:
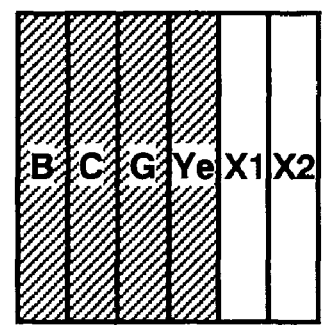
Figure 30B:
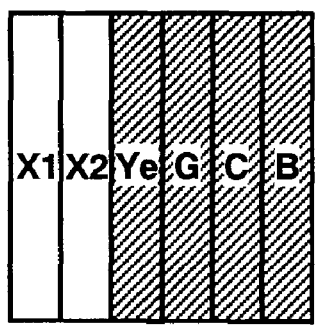
Figure 30D:
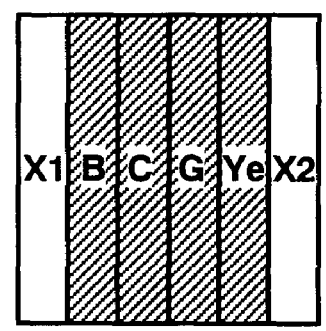

Table 21 shows the Y value and other parameters of each subpixel in this Example, and Table 22 shows the Y value and other parameters of each primary color in this Example. Moreover, spectral transmittance characteristics of color filters and a backlight spectrum in this Example are shown in FIGS. 25 and 26.

As seen from Table 21, since the first and second red subpixels R1 and R2 had a slightly low Y value of 4%, which is not within the preferable value range shown in Table 6 (i.e., no less than 5% and no more than 11%), the Y value of red was not sufficiently raised. As a result, as seen from Table 22, the Y value of red was slightly low, i.e., 7.9%, which is not within the preferable value range shown in Table 5 (i.e., no less than 10% and no more than 22%). This makes the displayed red slightly darker than is attained in Examples 1 to 7. Moreover, since the first and second red subpixels R1 and R2 had a slightly low Y value, the Y value of magenta was not sufficiently raised. As a result, as seen from Table 22, the Y value of magenta was slightly low, i.e., 13.1%, which is not within the preferable value range (i.e., no less than 15% and no more than 30%) shown in Table 5. This makes the displayed magenta slightly darker than is attained in Examples 1 to 7.

bumpy when displayed. Such bumpiness can be prevented by disposing the first red subpixel R1 and second red subpixel R2 so as to be contiguous.

Next, FIGS. 28A to 28F show examples of preferable arrangement of the green subpixel G and yellow subpixel Ye. In FIGS. 28A to 28F, each subpixel X1, X2, X3 or X4 represents one of the first red subpixel R1, the second red subpixel R2, the blue subpixel B, and the cyan subpixel C.

It is preferable that, as shown in FIGS. 28A to 28F, the green subpixel G and yellow subpixel Ye are contiguous within the pixel and interposed between other subpixels (i.e., so as not to be at the ends of the pixel). As shown in Table 6 and the like, the green subpixel G and yellow subpixel Ye have higher Y values than does any other subpixel. Therefore, by disposing the green subpixel G and yellow subpixel Ye near the center of the pixel as shown, problems such as unwanted edge coloring of displayed text characters can be suppressed.

Next, FIGS. 29A to 29F show examples of preferable arrangement of the first red subpixel R1, second red subpixel R2, green subpixel G and yellow subpixel Ye. In FIGS. 29A to 29F, the subpixel X1 or X2 is either the blue subpixel B or the cyan subpixel C.

It is preferable that, as shown in FIGS. 29A to 29F, the first red subpixel R1, second red subpixel R2, green subpixel G,

TABLE 21

|  | W | R1 | R1 | Ye | G | C | B |
|---|---|---|---|---|---|---|---|
| Y [%] | 100 | 4.0 | 4.0 | 57.0 | 21.5 | 8.6 | 5.3 |
| x | 0.284 | 0.656 | 0.656 | 0.479 | 0.246 | 0.137 | 0.146 |
| y | 0.286 | 0.299 | 0.299 | 0.513 | 0.668 | 0.107 | 0.047 |
| Dominant Wavelength [nm] | 9335* | 625 | 625 | 575 | 540 | 473 | 462 |
| Color Purity [%] |  | 88 | 88 | 98 | 80 | 89 | 86 |
| Display Quality |  | X | X | X | ◯ | X | ◉ |

*Color Temperature (K)

TABLE 22

|  | W | R* | Ye* | G | C* | B | M* |
|---|---|---|---|---|---|---|---|
| Y [%] | 100 | 7.9 | 86.2 | 21.5 | 35.2 | 5.3 | 13.1 |
| x | 0.286 | 0.656 | 0.463 | 0.246 | 0.157 | 0.146 | 0.242 |
| y | 0.287 | 0.299 | 0.510 | 0.668 | 0.156 | 0.047 | 0.094 |
| Dominant Wavelength [nm] |  | 625 | 574 | 540 | 477 | 462 | 567† |
| Color Purity [%] |  | 88 | 92 | 80 | 77 | 96 | 78 |
| Display Quality |  | Δ | ◉ | ◉ | ◉ | ◉ | Δ |

*R = R1 + R2
*Ye = R1 + R2 + Ye + G
*C = G + C + B
*M = R1 + R2 + B
†Complementary Wavelength (nm)

Next, preferable examples of subpixel arrangement within a pixel will be described.

First, FIGS. 27A to 27E show examples of preferable arrangement of the first red subpixel R1 and second red subpixel R2. In FIGS. 27A to 27E, each subpixel X1, X2, X3 or X4 represents one of the green subpixel G, the blue subpixel B, the yellow subpixel Ye, and the cyan subpixel C.

It is preferable that, as shown in FIGS. 27A to 27E, the first red subpixel R1 and second red subpixel R2 are contiguous within the pixel. If the first red subpixel R1 and second red subpixel R2 are apart from each other within the pixel (i.e., sandwiching any other subpixel(s)), a red line may appear and yellow subpixel Ye are contiguous within the pixel. By disposing those subpixels which contribute to displaying of yellow so as to be contiguous within the pixel, bumpiness can be prevented when displaying a yellow line. Moreover, since the first red subpixel R1 and second red subpixel R2 are contiguous in the arrangements shown in FIGS. 29A to 29F, it is also possible to prevent bumpiness when displaying a red line. Furthermore, since the green subpixel G and yellow subpixel Ye are contiguous and interposed between other subpixels in the arrangements shown in FIGS. 29A, 29B, 29E and 29F, unwanted edge coloring of displayed text characters can also be prevented.

Next, FIGS. 30A to 30D show examples of preferable arrangement of the cyan subpixel C, green subpixel G, and blue subpixel B. In FIGS. 30A to 30D, the subpixel X1 or X2 is either the first red subpixel R1 or the second red subpixel R2.

It is preferable that, as shown in FIGS. 30A to 30D, the cyan subpixel C, green subpixel G, and blue subpixel B are contiguous within the pixel. By disposing those subpixels which contribute to displaying of cyan so as to be contiguous within the pixel, bumpiness can be prevented when displaying a cyan line. Moreover, since the green subpixel G and yellow subpixel Ye are contiguous and interposed between other subpixels in the arrangements shown in FIGS. 30A to 30D, unwanted edge coloring of displayed text characters can also be prevented.

Figure 31A:
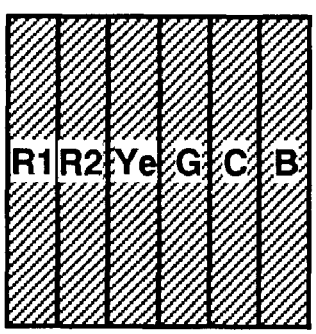
FIGS. 31A and 31B are diagrams showing preferable examples of subpixel arrangement.
Figure 31B:
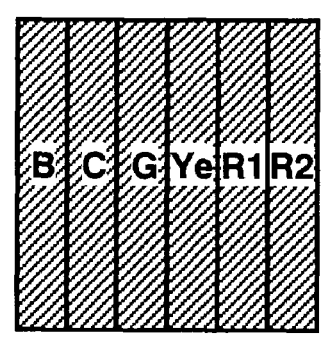

Next, FIGS. 31A and 31B show preferable example arrangements of all subpixels. In the arrangements shown in FIGS. 31A and 31B, the first red subpixel R1 and second red subpixel R2 are contiguous, so that bumpiness can be prevented when displaying a red line. Moreover, the green subpixel G and yellow subpixel Ye are contiguous and interposed between other subpixels, so that unwanted edge coloring of displayed text characters can also be prevented. Furthermore, subpixels contributing to displaying of yellow (i.e., the first red subpixel R1, second red subpixel R2, green subpixel G, and yellow subpixel Ye) are contiguous, so that bumpiness can be prevented when displaying a yellow line. Moreover, subpixels contributing to displaying of cyan (i.e., the cyan subpixel C, green subpixel G, and blue subpixel B) are contiguous, so that bumpiness can be prevented also when displaying a cyan line.

The present preferred embodiment has been described with respect to the case where a plurality of subpixels are arranged in a single row within each pixel, as exemplified in FIG. 1. Alternatively, the present invention is also applicable to a liquid crystal display device 200 shown in FIG. 32, where a plurality of subpixels are disposed in a plurality of rows and a plurality of columns within each pixel P (e.g., two rows and three rows as shown). By adopting such a mosaic arrangement, too, the color gamut can be expanded and bright red can be displayed, as is the case with the liquid crystal display device 100 shown in FIG. 1.

Now, preferable subpixel arrangements in the case where mosaic arrangement is adopted will be described.

Figure 33A:
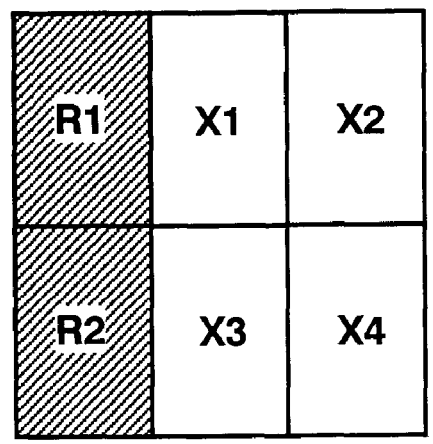
FIGS. 33A, 33B and 33C are diagrams showing preferable examples of subpixel arrangement.
Figure 33B:
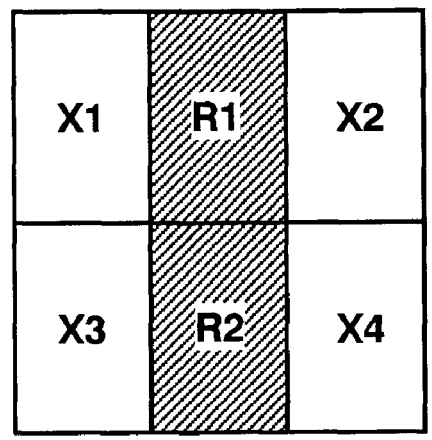
Figure 33C:
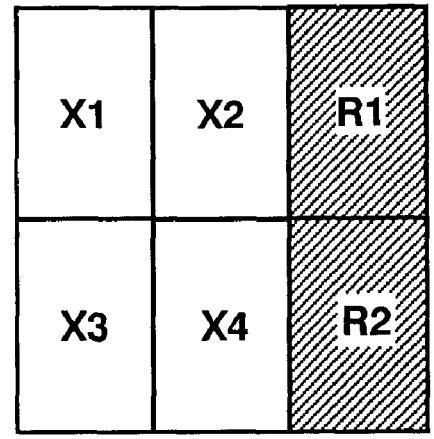

First, FIGS. 33A to 33C show examples of preferable arrangement of the first red subpixel R1 and second red subpixel R2. In FIGS. 33A to 33C, each subpixel X1, X2, X3 or X4 represents one of the green subpixel G, the blue subpixel B, yellow subpixel Ye, and the cyan subpixel C.

By disposing the first red subpixel R1 and second red subpixel R2 so as to be contiguous within the pixel as shown in FIGS. 33A to 33C, bumpiness can be prevented when displaying a red line.

Figure 34A:
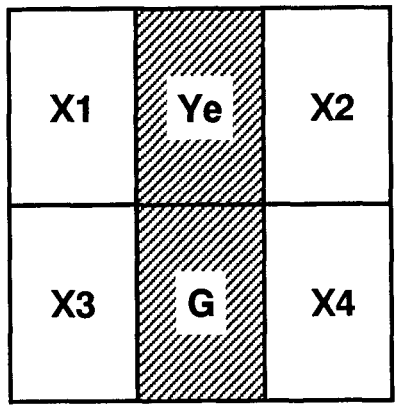
FIGS. 34A and 34B are diagrams showing preferable examples of subpixel arrangement.
Figure 34B:
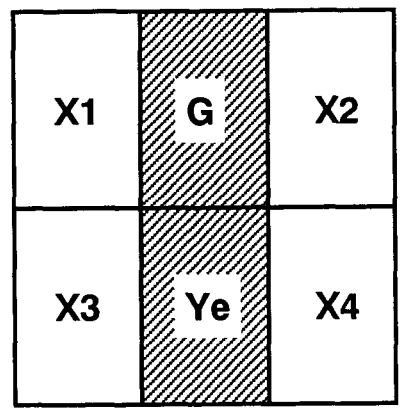
Figure 35A:
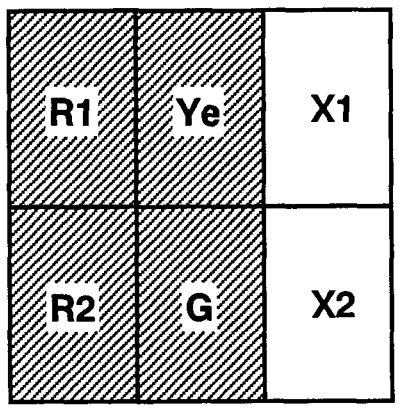
FIGS. 35A, 35B, 35C and 35D are diagrams showing preferable examples of subpixel arrangement.
Figure 35B:
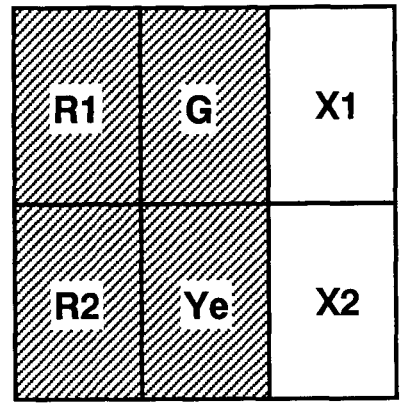
Figure 35C:
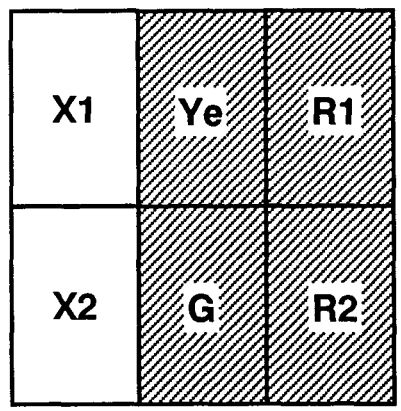
Figure 35D:
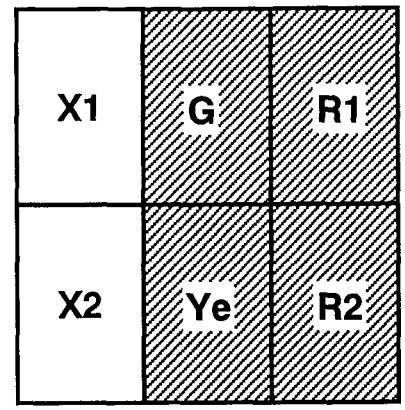
Figure 36A:
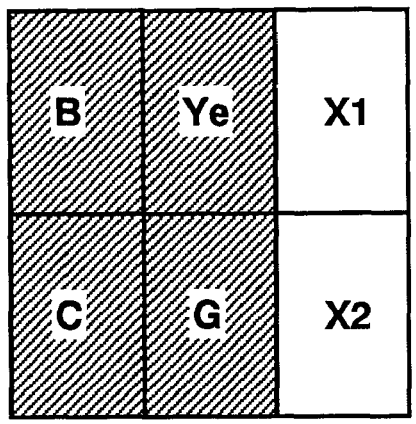
FIGS. 36A, 36B, 36C and 36D are diagrams showing preferable examples of subpixel arrangement.
Figure 36B:
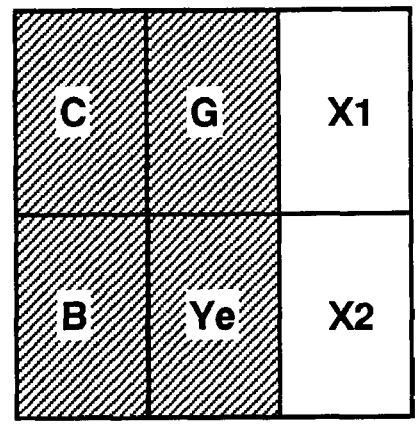
Figure 36C:
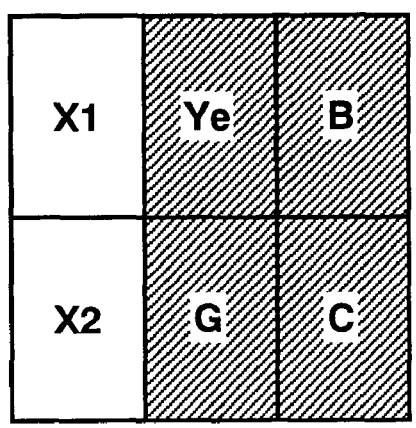
Figure 36D:
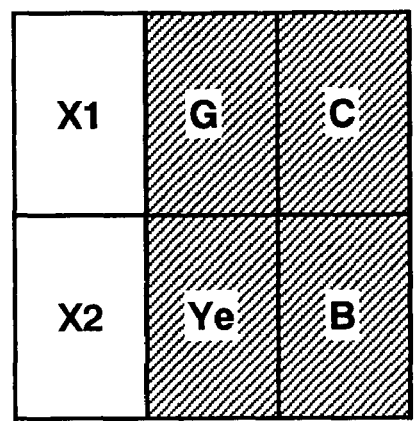
Figure 37A:
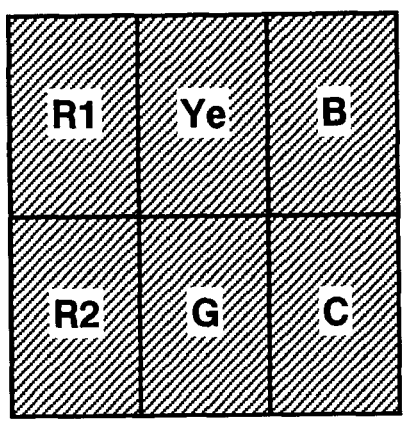
FIGS. 37A, 37B, 37C and 37D are diagrams showing preferable examples of subpixel arrangement.
Figure 37B:
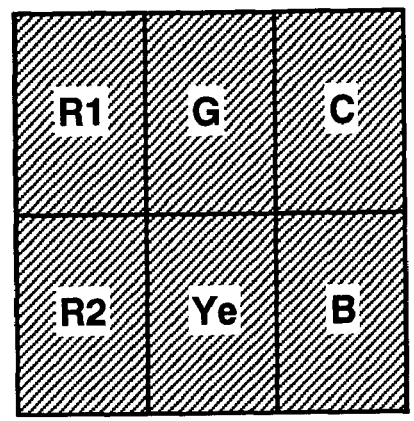
Figure 37C:
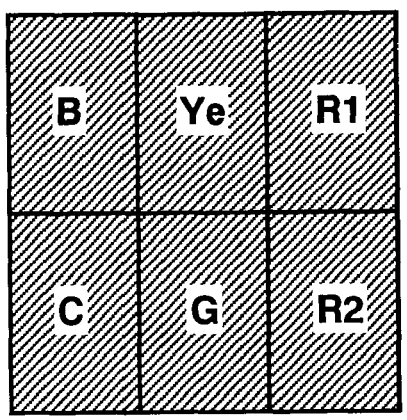
Figure 37D:
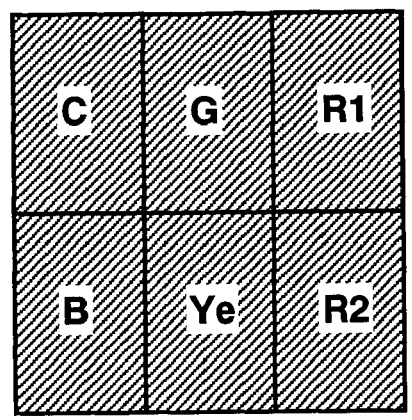

Next, FIGS. 34A and 34B show examples of preferable arrangement of the green subpixel G and yellow subpixel Ye. In FIGS. 34A and 34B, each subpixel X1, X2, X3 or X4 represents one of the first red subpixel R1, the second red subpixel R2, the blue subpixel B, and the cyan subpixel C.

As shown in FIGS. 34A and 34B, by disposing the green subpixel G and yellow subpixel Ye so as to be contiguous within the pixel and interposed between other subpixels (i.e., so as not to be at the ends of the pixel), unwanted edge coloring of displayed text characters can be prevented.

Next, FIGS. 35A to 35D show examples of preferable arrangement of the first red subpixel R1, second red subpixel R2, green subpixel G, and yellow subpixel Ye. In FIGS. 35A to 35D, the subpixel X1 or X2 is either the blue subpixel B or the cyan subpixel C.

It is preferable that, as shown in FIGS. 35A to 35D, the first red subpixel R1, second red subpixel R2, green subpixel G, and yellow subpixel Ye are contiguous within the pixel. By disposing those subpixels which contribute to displaying of yellow so as to be contiguous within the pixel, bumpiness can be prevented when displaying a yellow line. Moreover, since the first red subpixel R1 and second red subpixel R2 are contiguous in the arrangements shown in FIGS. 35A to 35D, it is also possible to prevent bumpiness when displaying a red line. Furthermore, since the green subpixel G and yellow subpixel Ye are contiguous and interposed between other subpixels in the arrangements shown in FIGS. 35A to 35D, unwanted edge coloring of displayed text characters can also be prevented.

Next, FIGS. 36A to 36D show examples of preferable arrangement of the cyan subpixel C, green subpixel G, and blue subpixel B. In FIGS. 36A to 36D, the subpixel X1 or X2 is either the first red subpixel R1 or the second red subpixel R2.

It is preferable that, as shown in FIGS. 36A to 36D, the cyan subpixel C, green subpixel G, and blue subpixel B are contiguous within the pixel. By disposing those subpixels which contribute to displaying of cyan so as to be contiguous within the pixel, bumpiness can be prevented when displaying a cyan line. Moreover, since the green subpixel G and yellow subpixel Ye are contiguous and interposed between other subpixels in the arrangements shown in FIGS. 36A to 36D, unwanted edge coloring of displayed text characters can also be prevented.

Next, FIGS. 37A to 37D show preferable example arrangements of all subpixels. In the arrangements shown in FIGS. 37A to 37D, the first red subpixel R1 and second red subpixel R2 are contiguous, so that bumpiness can be prevented when displaying a red line. Moreover, the green subpixel G and yellow subpixel Ye are contiguous and interposed between other subpixels, so that unwanted edge coloring of displayed text characters can be prevented. Furthermore, subpixels contributing to displaying of yellow (i.e., the first red subpixel R1, second red subpixel R2, green subpixel G, and yellow subpixel Ye) are contiguous, so that bumpiness can be prevented when displaying a yellow line. Moreover, subpixels contributing to displaying of cyan (i.e., the cyan subpixel C, green subpixel G, and blue subpixel B) are contiguous, so that bumpiness can be prevented also when displaying a cyan line.

Figure 38A:
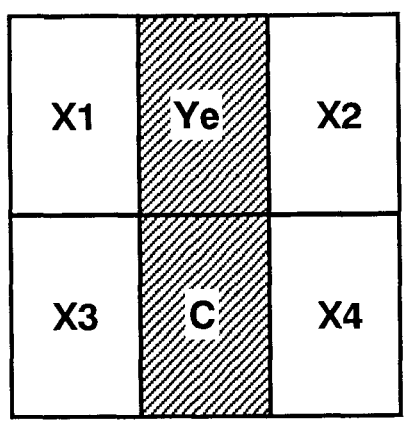
FIGS. 38A and 38B are diagrams showing preferable examples of subpixel arrangement.
Figure 38B:
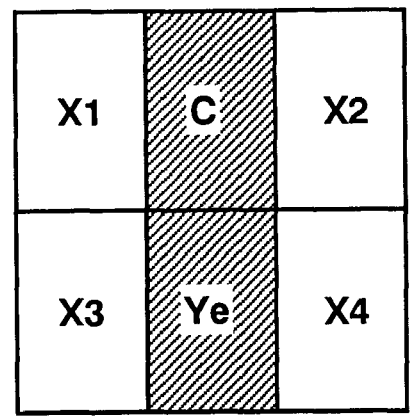
Figure 39A:
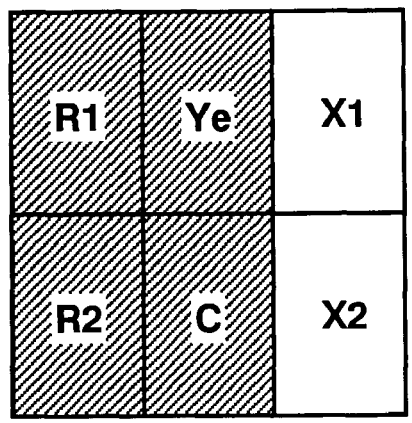
FIGS. 39A, 39B, 39C and 39D are diagrams showing preferable examples of subpixel arrangement.
Figure 39B:
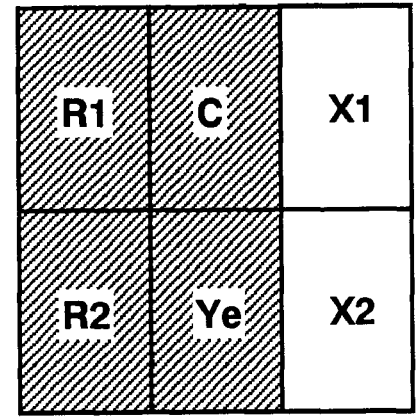
Figure 39C:
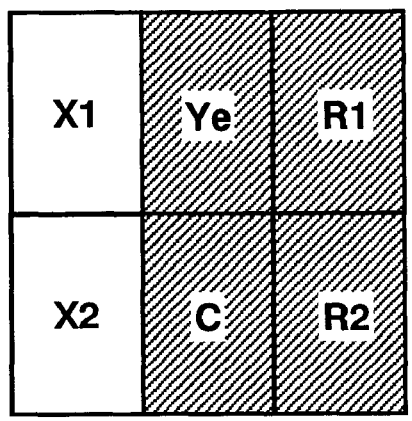
Figure 39D:
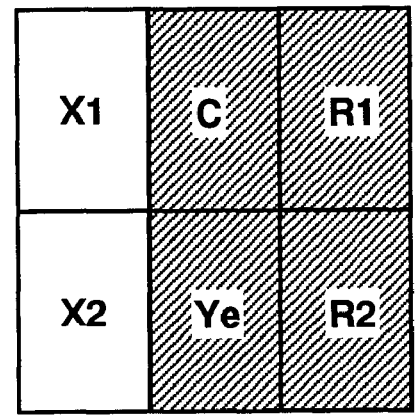

Alternatively, it is also preferable that, as shown in FIGS. 38A and 38B, the yellow subpixel Ye and cyan subpixel C are contiguous within the pixel and interposed between other subpixels (i.e., so as not to be at the ends of the pixel). In FIGS. 38A and 38B, each subpixel X1, X2, X3 or X4 represents one of the first red subpixel R1, the second red subpixel R2, the green subpixel G, and the blue subpixel B. As shown in Table 6 and the like, the cyan subpixel C also has a high Y value, although not quite as high as those of the yellow subpixel Ye and the green subpixel G. Therefore, by disposing the yellow subpixel Ye and cyan subpixel C near the center of the pixel as shown, too, the effect of suppressing unwanted edge coloring of displayed text characters can be obtained.

FIGS. 39A to 39D show other examples of preferable arrangement. In FIGS. 39A to 39D, the subpixel X1 or X2 is either the subpixel G or the blue subpixel B. In the arrangements shown in FIGS. 39A to 39D, the first red subpixel R1 and second red subpixel R2 are contiguous, so that bumpiness can be prevented when displaying a red line. Moreover, the yellow subpixel Ye and cyan subpixel C are contiguous and interposed between other subpixels, so that unwanted edge coloring of displayed text characters.

Although the above description has been directed to constructions where each pixel is defined by six subpixels, the present invention is not limited thereto. Also in constructions where each pixel is defined by more (seven or more) subpixels, or each pixel is defined by five subpixels, the effect of displaying bright red can be obtained so long as each pixel includes the first red subpixel R1 and second red subpixel R2.

Figure 40A:
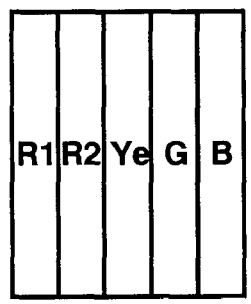
FIGS. 40A and 40B are diagrams showing other examples of subpixel arrangement.
Figure 40B:
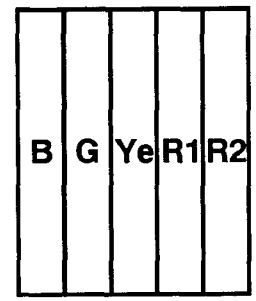

FIGS. 40A and 40B show examples of pixels defined by five subpixels. The pixels shown in FIGS. 40A and 40B are each defined by the first red subpixel R1, second red subpixel R2, green subpixel G, blue subpixel B, and yellow subpixel Ye, and respectively correspond to the pixels shown in FIGS. 31A and 31B, from which the cyan subpixel C is omitted.

Also when a construction as shown in FIG. 40A or 40B is adopted, because of inclusion of the yellow subpixel Ye in each pixel, a wide color gamut can be realized than in any conventional commonly-used liquid crystal display device which performs display by using three primaries. Moreover, since each pixel includes the first red subpixel R1 and second red subpixel R2, it is also possible to display bright red.

In the case where each pixel is defined by five subpixels, too, it is preferable that the first red subpixel R1 and second red subpixel R2 are contiguous, and that the green subpixel G and yellow subpixel Ye are contiguous and interposed between other subpixels, as exemplified in FIGS. 40A and 40B. Moreover, it is preferable that subpixels contributing to displaying of yellow (i.e., the first red subpixel R1, second red subpixel R2, green subpixel G, and yellow subpixel Ye) are contiguous, and that subpixels contributing to displaying of cyan (i.e., the green subpixel G and blue subpixel B) are contiguous.

In the case where each pixel is defined by five subpixels, it is preferable that each pixel includes the yellow subpixel Ye, rather than the cyan subpixel C. Since the yellow subpixel Ye has a higher Y value than does the cyan subpixel C, inclusion of the yellow subpixel Ye will allow for brighter display across the entire pixel.

Figure 41:
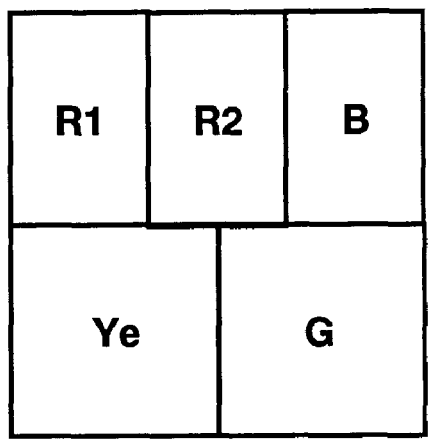
FIG. 41 is a diagram showing another example of subpixel arrangement.

In the constructions illustrated above, the plurality of subpixels defining each pixel are of substantially the same size. Alternatively, the plurality of subpixels defining each pixel may be of different sizes, as exemplified in FIG. 41. In the construction shown in FIG. 41, the green subpixel G and yellow subpixel Ye have a size which is 1.5 times as large as that of the first red subpixel R1, second red subpixel R2, and blue subpixel B. Such construction also allows bright red to be displayed. Note that the arrangement shown in FIG. 41 is preferable in that the first red subpixel R1 and second red subpixel R2 are contiguous, and also that subpixels contributing to displaying of yellow (i.e., the first red subpixel R1, second red subpixel R2, green subpixel G, and yellow subpixel Ye) are contiguous.

However, using subpixels of different sizes may make the designing of the display device difficult, or complicate the production steps of the display device. Such problems will not occur in the case where the plurality of subpixels defining each pixel are of substantially same size.

Next, the more specific structure of the liquid crystal display devices 100 and 200 according to the present embodiment will be described.

Figure 42:
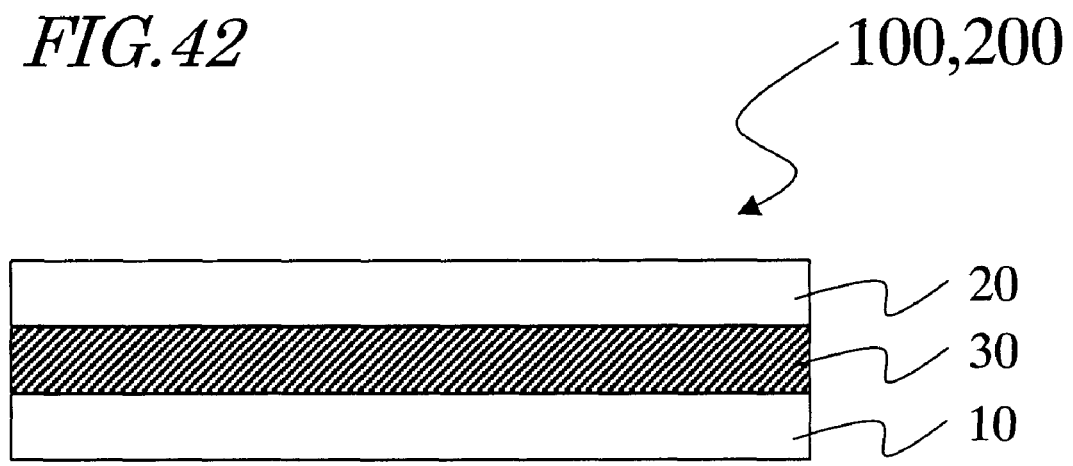
FIG. 42 is a cross-sectional view schematically showing liquid crystal display devices 100 and 200.

As shown in FIG. 42, the liquid crystal display device 100 or 200 includes an active matrix substrate 10, a color filter substrate 20, and a liquid crystal layer 30 interposed therebetween, for example.

Although not shown, a plurality of switching elements (e.g., TFTs) and pixel electrodes which are electrically connected to the respective switching elements are provided on the active matrix substrate 10.

Figure 43A:
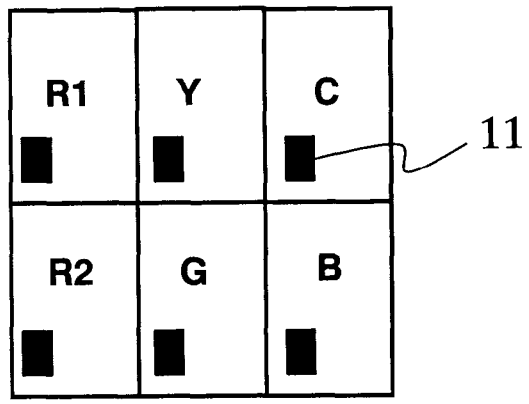
FIGS. 43A and 43B are diagrams showing an example of switching element arrangement.
Figure 43B:
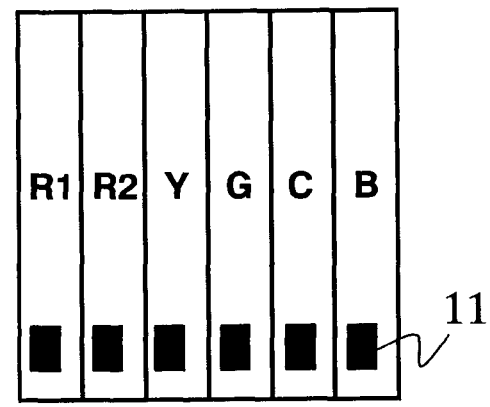
Figure 44A:
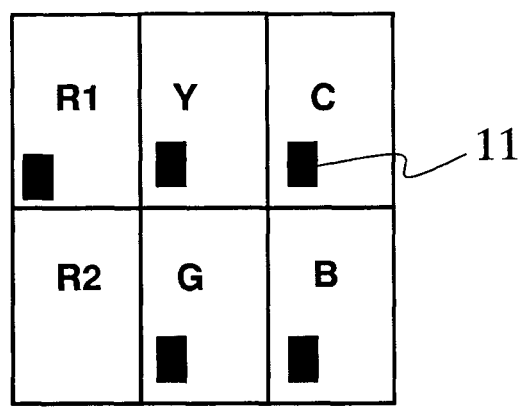
FIGS. 44A and 44B are diagrams showing other examples of switching element arrangement.
Figure 44B:
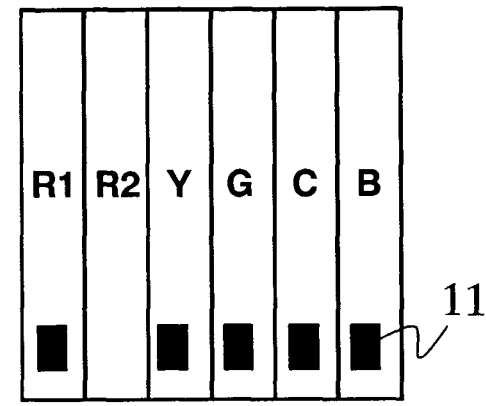

Typically, as shown in FIGS. 43A and 43B, a switching element 11 is provided corresponding to each subpixel, so that each subpixel is driven independently. However, as shown in FIGS. 44A and 44B, the switching element 11 corresponding to one of the first red subpixel R1 and the second red subpixel R2 may be omitted, so that the first red subpixel R1 and second red subpixel R2 are driven with the one same switching element 11.

When using a construction where the first red subpixel R1 and second red subpixel R2 are driven independently of each other, it is possible to reduce the viewing angle dependence of γ characteristics (i.e., disagreement between the γ characteristics when observing a display surface in the frontal direction and the γ characteristics when observing the display surface in an oblique direction).

As a technique for reducing the viewing angle dependence of γ characteristics, a technique called multipixel driving is proposed in Japanese Laid-Open Patent Publication Nos. 2004-62146 and 2004-78157. In this technique, one subpixel is divided into two regions, and different voltages are applied to these regions, whereby the viewing angle dependence of γ characteristics is reduced.

When using a construction where the first red subpixel R1 and second red subpixel R2 are driven independently of each other, it is naturally possible to apply different voltages across the liquid crystal layer over the first red subpixel R1 and the liquid crystal layer over the second red subpixel R2. Therefore, an effect of reducing the viewing angle dependence of γ characteristics is obtained, similarly to the multipixel driving disclosed in Japanese Laid-Open Patent Publication Nos. 2004-62146 and 2004-78157, supra.

Figure 45:
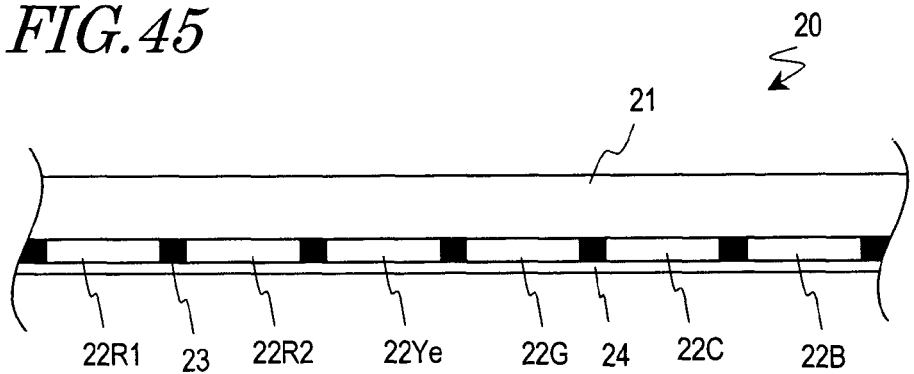
FIG. 45 is a cross-sectional view schematically showing a color filter substrate of the liquid crystal display device 100.

With respect to the liquid crystal display device 100, for example, a specific construction of the color filter substrate 20 is shown in FIG. 45. The color filter substrate 20 includes a transparent substrate (e.g., a glass substrate or a plastic substrate) 21 and a plurality of color filters provided in regions of the substrate 21 respectively corresponding to the pixels.

Specifically, the plurality of color filters are: first and second red color filters 22R1 and 22R2 which allow red light to be transmitted therethrough; a green color filter 22G which allows green light to be transmitted therethrough; a blue color filter 22B which allows blue light to be transmitted therethrough; a yellow color filter 22Ye which allows yellow light to be transmitted therethrough; and a cyan color filter 22C which allows cyan light to be transmitted therethrough.

A black matrix 23 is provided in between color filters. Moreover, a counter electrode 24 is provided on the color filters and the black matrix 23.

The color filters can be formed by a known technique, e.g., ink jet technique.

As has already been described, the liquid crystal display devices 100 and 200 perform multiprimary display. Therefore, the liquid crystal display devices 100 and 200 include a multiprimary controller which receives externally-input image signals and generates various control signals for multiprimary displaying. An example of a multiprimary controller is shown in FIG. 46.

The multiprimary controller 40 shown in FIG. 46 includes a conversion matrix 41, a mapping unit 42, a plurality of two-dimensional look-up tables 43, and a multiplier 44.

Externally-input RGB signals are converted by the conversion matrix 41 into signals (XYZ signals) which correspond to the color space of the XYZ color system. The XYZ signals are mapped by the mapping unit 42 onto the xy coordinate space, whereby signals corresponding to the Y value and chromaticity coordinates (x, y) are generated. There are as many two-dimensional look-up tables 43 as there are primary colors. Based on these two-dimensional look-up tables 43, data (r, g, b, ye, c) corresponding to the hue and chroma of the color to be displayed in each subpixel is generated from the chromaticity coordinates (x, y). Such data and the Y value are multiplied in the multiplier 44, whereby signals R, G, B, Ye, and C corresponding to the respective primary colors are generated. Note that the technique for generating signals for multiprimary displaying is not to be limited to the technique described herein, which is only exemplary.

According to the present invention, there is provided a display device which has a wide color gamut and is able to display bright red. Also according to the present invention, there is provided a color filter substrate to be used in such a display device.

The present invention is suitably used for various display devices, e.g., liquid crystal display devices, CRTs (cathode-ray tubes), organic EL display devices, plasma display panels, and SEDs (Surface-conduction Electron-emitter Displays).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Application No. 2005-274510 filed in Japan on Sep. 21, 2005, the entire contents of which are hereby incorporated by reference.

What is claimed is:

1. An electronic display device comprising:
a pixel defined by a plurality of subpixels including first and second red subpixels, a green subpixel, and a yellow subpixel; and
a circuit arranged to drive the plurality of subpixels; wherein
a total number of red subpixels in the pixel is greater than a total number of green subpixels in the pixel or a total number of yellow subpixels in the pixel; and
a total Y value of the first and second red subpixels is no less than 10% and no more than 22%, where a Y value in the XYZ color system of the pixel when displaying white is defined as 100%.

2. The electronic display device of claim 1, wherein, the green subpixel has a Y value of no less than 20% and no more than 35% and the yellow subpixel has a Y value of no less than 30% and no more than 50%.

3. The electronic display device of claim 1, wherein, the first and second red subpixels each have a dominant wavelength of no less than 605 nm and no more than 635 nm; the green subpixel has a dominant wavelength of no less than 520 nm and no more than 550 nm; and the yellow subpixel has a dominant wavelength of no less than 565 nm and no more than 580 nm.

4. The electronic display device of claim 1, wherein, the first and second red subpixels each have a color purity of no less than 90%; the green subpixel has a color purity of no less than 65% and no more than 80%; and the yellow subpixel has a color purity of no less than 85% and no more than 95%.

5. The electronic display device of claim 1, wherein the plurality of subpixels are of substantially the same size.

6. The electronic display device of claim 1, wherein the first and second red subpixels are driven independently of each other.

7. The electronic display device of claim 1, wherein the first and second red subpixels are driven by a same switching element.

8. The electronic display device of claim 1, wherein, within the pixel, the first red subpixel and the second red subpixel are disposed contiguous to each other.

9. The electronic display device of claim 1, wherein, within the pixel, the green subpixel and the yellow subpixel are disposed contiguous to each other and interposed between other subpixels.

10. The display electronic device of claim 1, wherein, within the pixel, the first red subpixel, the second red subpixel, the green subpixel, and the yellow subpixel are disposed contiguous to one another.

11. The electronic display device of claim 1, wherein the plurality of subpixels further includes a cyan subpixel.

12. The electronic display device of claim 11, wherein the cyan subpixel has a Y value of no less than 10% and no more than 30%.

13. The electronic display device of claim 11, wherein the cyan subpixel has a dominant wavelength of no less than 475 nm and no more than 500 nm.

14. The electronic display device of claim 11, wherein the cyan subpixel has a color purity of no less than 65% and no more than 80%.

15. The electronic display device of claim 11, wherein, within the pixel, the cyan subpixel, and the green subpixel are disposed contiguous to one another.

16. The electronic display device of claim 1, which is a liquid crystal display device comprising a liquid crystal layer.

17. A color filter substrate for a display device comprising:
a substrate; and
a pixel defined by a plurality of color filters provided on the substrate and including first and second red color filters; a green color filter; and a yellow color filter; wherein
a total number of red filters in the pixel is greater than a total number of green filters in the pixel or a total number of yellow filters in the pixel; and
a total Y value of red light transmitted from the first and second red filters is no less than 10% and no more than 22%, where a Y value in the XYZ color system of the pixel when displaying white is defined as 100%.

18. The color filter substrate of claim 17, wherein the plurality of color filters further include a cyan color filter.

19. The color filter substrate of claim 17, wherein the plurality of color filters further includes a blue color filter.

20. The electronic display device of claim 1, wherein, within the pixel, the green subpixel is interposed between other subpixels.

21. The electronic display device of claim 11, wherein, within the pixel, the cyan subpixel is interposed between other subpixels.

22. The electronic display device of claim 11, wherein, within the pixel, the green subpixel and the cyan subpixel are disposed contiguous to each other and interposed between other subpixels.

23. The electronic display device of claim 1, wherein, yellow displayed by the first red subpixel, the second red subpixel, the green subpixel, and the yellow subpixel has a Y value of no less than 60% and no more than 85%.

24. The electronic display device of claim 1, wherein, red displayed by the first and second red subpixels has a dominant wavelength of no less than 605 nm and no more than 635 nm; green displayed by the green subpixel has a dominant wavelength of no less than 520 nm and no more than 550 nm; and yellow displayed by the first red subpixel, the second red subpixel, the green subpixel, and the yellow subpixel has a dominant wavelength of no less than 565 nm and no more than 580 nm.

25. The electronic display device of claim 1, wherein, red displayed by the first and second red subpixels has a color purity of no less than 90%; green displayed by the green subpixel has a color purity of no less than 65% and no more than 80%; and yellow displayed by the first red subpixel, the second red subpixel, the green subpixel, and the yellow subpixel has a color purity of no less than 85% and no more than 95%.

26. An electronic display device comprising:
a pixel defined by a plurality of subpixels including first and second red subpixels, a green subpixel, and a yellow subpixel; and
a circuit arranged to drive the plurality of subpixels; wherein
a total area of red subpixels in the pixel is greater than a total area of green subpixels in the pixel or a total area of yellow subpixels in the pixel; and
a total Y value of the first and second red subpixels is no less than 10% and no more than 22%, where a Y value in the XYZ color system of the pixel when displaying white is defined as 100%.

27. The electronic display device of claim 26, wherein, the green subpixel has a Y value of no less than 20% and no more than 35% and the yellow subpixel has a Y value of no less than 30% and no more than 50%.

28. The electronic display device of claim 26, wherein, the first and second red subpixels each have a dominant wavelength of no less than 605 nm and no more than 635 nm; the green subpixel has a dominant wavelength of no less than 520 nm and no more than 550 nm; and the yellow subpixel has a dominant wavelength of no less than 565 nm and no more than 580 nm.

29. The electronic display device of claim 26, wherein, the first and second red subpixels each have a color purity of no less than 90%; the green subpixel has a color purity of no less than 65% and no more than 80%; and the yellow subpixel has a color purity of no less than 85% and no more than 95%.

30. The electronic display device of claim 26, wherein the plurality of subpixels are of substantially the same size.

31. The electronic display device of claim 26, wherein the first and second red subpixels are driven independently of each other.

32. The electronic display device of claim 26, wherein the first and second red subpixels are driven by a same switching element.

33. The electronic display device of claim 26, wherein, within the pixel, the first red subpixel and the second red subpixel are disposed contiguous to each other.

34. The electronic display device of claim 26, wherein, within the pixel, the green subpixel and the yellow subpixel are disposed contiguous to each other and interposed between other subpixels.

35. The electronic display device of claim 26, wherein, within the pixel, the first red subpixel, the second red subpixel, the green subpixel, and the yellow subpixel are disposed contiguous to one another.

36. The electronic display device of claim 26, wherein the plurality of subpixels further includes a cyan subpixel.

37. The electronic display device of claim 36, wherein the cyan subpixel has a Y value of no less than 10% and no more than 30%.

38. The electronic display device of claim 36, wherein the cyan subpixel has a dominant wavelength of no less than 475 nm and no more than 500 nm.

39. The electronic display device of claim 36, wherein the cyan subpixel has a color purity of no less than 65% and no more than 80%.

40. The electronic display device of claim 36, wherein, within the pixel, the cyan subpixel and the green subpixel are disposed contiguous to one another.

41. The electronic display device of claim 26, which is a liquid crystal display device comprising a liquid crystal layer.

42. A color filter substrate for a display device comprising:
a substrate; and
a pixel defined by a plurality of color filters provided on the substrate and including first and second red color filters; a green color filter; and a yellow color filter; wherein
a total area of red filters in the pixel is greater than a total area of green filters in the pixel or a total area of yellow filters in the pixel; and
a total Y value of red light transmitted from the first and second red filters is no less than 10% and no more than 22%, where a Y value in the XYZ color system of the pixel when displaying white is defined as 100%.

43. The color filter substrate of claim 42, wherein the plurality of color filters further include a cyan color filter for allowing cyan light to be transmitted therethrough.

44. The electronic display device of claim 26, wherein, within the pixel, the green subpixel is interposed between other subpixels.

45. The electronic display device of claim 36, wherein, within the pixel, the cyan subpixel is interposed between other subpixels.

46. The electronic display device of claim 36, wherein, within the pixel, the green subpixel and the cyan subpixel are disposed contiguous to each other and interposed between other subpixels.

47. The electronic display device of claim 26, wherein, yellow displayed by the first red subpixel, the second red subpixel, the green subpixel, and the yellow subpixel has a Y value of no less than 60% and no more than 85%.

48. The electronic display device of claim 26, wherein, red displayed by the first and second red subpixels has a dominant wavelength of no less than 605 nm and no more than 635 nm; green displayed by the green subpixel has a dominant wavelength of no less than 520 nm and no more than 550 nm; and yellow displayed by the first red subpixel, the second red subpixel, the green subpixel, and the yellow subpixel has a dominant wavelength of no less than 565 nm and no more than 580 nm.

49. The electronic display device of claim 26, wherein, red displayed by the first and second red subpixels has a color purity of no less than 90%; green displayed by the green subpixel has a color purity of no less than 65% and no more than 80%; and yellow displayed by the first red subpixel, the second red subpixel, the green subpixel, and the yellow subpixel has a color purity of no less than 85% and no more than 95%.

50. The electronic display device of claim 1, wherein the plurality of subpixels further includes a blue subpixel.

51. The electronic display device of claim 50, wherein the blue subpixel has a Y value of no less than 5% and no more than 10%.

52. The electronic display device of claim 50, wherein the blue subpixel has a dominant wavelength of no more than 470 nm.

53. The electronic display device of claim 50, wherein the blue subpixel has a color purity of no less than 90% and no more than 95%.

54. The electronic display device of claim 26, wherein the plurality of subpixels further includes a blue subpixel.

55. The electronic display device of claim 26, wherein the blue subpixel has a Y value of no less than 5% and no more than 10%.

56. The electronic display device of claim 26, wherein the blue subpixel has a dominant wavelength of no more than 470 nm.

57. The electronic display device of claim 26, wherein the blue subpixel has a color purity of no less than 90% and no more than 95%.

58. The color filter substrate of claim 42, wherein the plurality of color filters further includes a blue color filter.

* * * * *